US009990642B2

(12) United States Patent
Strock et al.

(10) Patent No.: US 9,990,642 B2
(45) Date of Patent: *Jun. 5, 2018

(54) SYSTEM AND METHOD FOR GRANTING PROMOTIONAL REWARDS TO CREDIT ACCOUNT HOLDERS

(75) Inventors: Bradley R. Strock, Landenberg, PA (US); Lynn Hooper, Newark, DE (US); Eugene M. Glavin, West Chester, PA (US); Beth L. Bressler, Kennett Square, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 331 days.

This patent is subject to a terminal disclaimer.

(21) Appl. No.: 12/873,411

(22) Filed: Sep. 1, 2010

(65) Prior Publication Data
US 2011/0022448 A1 Jan. 27, 2011

Related U.S. Application Data

(63) Continuation of application No. 10/683,294, filed on Oct. 14, 2003.
(Continued)

(51) Int. Cl.
G06Q 30/02 (2012.01)
(52) U.S. Cl.
CPC ......... *G06Q 30/02* (2013.01); *G06Q 30/0207* (2013.01); *G06Q 30/0213* (2013.01);
(Continued)
(58) Field of Classification Search
CPC ................................................ G06Q 30/0207
(Continued)

(56) References Cited

U.S. PATENT DOCUMENTS 2,005,003 A 6/1935 Patton et al.
3,230,650 A 1/1966 Orkin
(Continued)

FOREIGN PATENT DOCUMENTS

CA 2293321 6/1998
EP 959440 11/1999
(Continued)

OTHER PUBLICATIONS

American Express website from the Wayback Machine, dated Nov. 18, 2000, Membership Rewards program, Answers to common questions.*
(Continued)

*Primary Examiner* — David J Stoltenberg
(74) *Attorney, Agent, or Firm* — Hunton Andrews Kurth LLP

(57) ABSTRACT

A system and method for providing promotional rewards is provided. First, a promotional reward is communicated to a customer. The promotional reward offer comprises a promotional reward associated with one or more promotional reward-earning behaviors and a promotional time frame. The offer may specify a customer population, and the customer may be enrolled in the promotional reward program if the customer is determined to be in the population. The customer is credited a promotional reward if the customer accomplishes the promotional reward-earning behavior(s) within the promotional time frame. The customer may also be enrolled in a base reward program. The promotional rewards and base rewards may be accumulated in a customer account. A system for implementing a promotional rewards program is also provided.

19 Claims, 4 Drawing Sheets

Related U.S. Application Data

(60) Provisional application No. 60/417,658, filed on Oct. 11, 2002.

(52) U.S. Cl.
CPC ..... *G06Q 30/0216* (2013.01); *G06Q 30/0231* (2013.01); *G06Q 30/0235* (2013.01); *G06Q 30/0236* (2013.01); *G06Q 30/0241* (2013.01)

(58) Field of Classification Search
USPC ....................................................... 705/14.1
See application file for complete search history.

(56) References Cited

U.S. PATENT DOCUMENTS

| | | |
|---|---|---|
| 3,634,669 A | 1/1972 | Soumas et al. |
| 3,713,235 A | 1/1973 | Roberts |
| 3,855,033 A | 12/1974 | Staats |
| 3,938,090 A | 2/1976 | Borison et al. |
| 4,022,943 A | 5/1977 | Erb et al. |
| D248,203 S | 6/1978 | Morse |
| 4,123,747 A | 10/1978 | Lancto et al. |
| 4,205,780 A | 6/1980 | Burns et al. |
| 4,223,403 A | 9/1980 | Konheim et al. |
| 4,264,808 A | 4/1981 | Owens et al. |
| 4,319,336 A | 3/1982 | Andersen et al. |
| 4,321,672 A | 3/1982 | Braun et al. |
| 4,338,587 A | 7/1982 | Chiappetti |
| 4,380,699 A | 4/1983 | Monnier et al. |
| 4,453,074 A | 6/1984 | Weinstein |
| 4,454,414 A | 6/1984 | Benton |
| 4,465,206 A | 8/1984 | Sorel et al. |
| 4,479,995 A | 10/1984 | Suzuki et al. |
| 4,545,838 A | 10/1985 | Minkus et al. |
| 4,575,127 A | 3/1986 | Michel |
| 4,575,621 A | 3/1986 | Dreifus |
| 4,605,820 A | 8/1986 | Campbell, Jr. |
| 4,605,844 A | 8/1986 | Haggan |
| 4,614,861 A | 9/1986 | Pavlov et al. |
| 4,634,845 A | 1/1987 | Riley |
| 4,641,239 A | 2/1987 | Takesako |
| 4,645,701 A | 2/1987 | Zarrow |
| 4,647,714 A | 3/1987 | Goto |
| 4,648,189 A | 3/1987 | Michel |
| 4,650,981 A | 3/1987 | Foletta |
| 4,661,658 A | 4/1987 | Matyas |
| 4,669,730 A | 6/1987 | Small |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,707,594 A | 11/1987 | Roth |
| 4,713,760 A | 12/1987 | Yamada et al. |
| 4,723,212 A | 2/1988 | O'Brien |
| 4,736,094 A | 4/1988 | Yoshida |
| 4,746,787 A | 4/1988 | Okada |
| 4,747,620 A | 5/1988 | Kay et al. |
| 4,752,676 A | 6/1988 | Leonard et al. |
| 4,754,418 A | 6/1988 | Hara |
| 4,755,661 A | 7/1988 | Ruebsam |
| 4,766,293 A | 8/1988 | Boston |
| 4,766,539 A | 8/1988 | Fox |
| 4,777,563 A | 10/1988 | Teraoka et al. |
| 4,789,928 A | 12/1988 | Fujisaki |
| 4,817,949 A | 4/1989 | Bachman et al. |
| 4,822,985 A | 4/1989 | Boggan et al. |
| 4,831,526 A | 5/1989 | Luchs |
| 4,839,504 A | 6/1989 | Nakano |
| 4,845,347 A | 7/1989 | McCrindle |
| 4,851,650 A | 7/1989 | Kitade |
| 4,856,857 A | 8/1989 | Takeuchi et al. |
| 4,859,837 A | 8/1989 | Halpern |
| 4,866,545 A | 9/1989 | Lamanna et al. |
| 4,868,376 A | 9/1989 | Lessin et al. |
| 4,870,259 A | 9/1989 | Boggan et al. |
| 4,877,947 A | 10/1989 | Masu et al. |
| 4,882,675 A | 11/1989 | Nichtberger et al. |
| 4,891,503 A | 1/1990 | Jewell |
| D305,887 S | 2/1990 | Nishimura |
| 4,906,826 A | 3/1990 | Spencer |
| 4,908,521 A | 3/1990 | Boggan et al. |
| 4,910,672 A | 3/1990 | Off |
| 4,923,288 A | 5/1990 | Allen et al. |
| 4,928,001 A | 5/1990 | Masada |
| 4,931,623 A | 6/1990 | Nakamura et al. |
| 4,938,830 A | 7/1990 | Cannistra |
| 4,941,090 A | 7/1990 | McCarthy |
| 4,943,707 A | 7/1990 | Boggan |
| 4,948,174 A | 8/1990 | Thomson et al. |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,977,501 A | 12/1990 | Lefevre |
| 4,986,868 A | 1/1991 | Schmidt |
| 4,992,940 A | 2/1991 | Dworkin |
| 5,023,782 A | 6/1991 | Lutz et al. |
| 5,025,139 A | 6/1991 | Halliburton, Jr. |
| 5,025,372 A | 6/1991 | Burton et al. |
| 5,049,728 A | 9/1991 | Rovin |
| 5,054,096 A | 10/1991 | Beizer |
| 5,055,662 A | 10/1991 | Hasewaga |
| 5,056,019 A | 10/1991 | Schultz et al. |
| 5,072,380 A | 12/1991 | Randelman et al. |
| 5,080,748 A | 1/1992 | Bonomi |
| 5,097,115 A | 3/1992 | Ogasawara et al. |
| 5,117,355 A | 5/1992 | McCarthy |
| 5,121,945 A | 6/1992 | Thomson et al. |
| 5,122,950 A | 6/1992 | Mee |
| 5,140,517 A | 8/1992 | Nagata et al. |
| 5,146,068 A | 9/1992 | Ugawa et al. |
| 5,163,098 A | 11/1992 | Dahbura |
| 5,173,851 A | 12/1992 | Off et al. |
| 5,175,682 A | 12/1992 | Higashiyama |
| 5,185,697 A | 2/1993 | Jacobs et al. |
| 5,187,750 A | 2/1993 | Behera |
| 5,201,010 A | 4/1993 | Gabriel |
| 5,202,286 A | 4/1993 | Nakatani |
| 5,206,488 A | 4/1993 | Teicher |
| 5,206,803 A | 4/1993 | Vitagliano |
| 5,231,569 A | 7/1993 | Myatt et al. |
| 5,237,620 A | 8/1993 | Deaton |
| 5,239,462 A | 8/1993 | Jones |
| 5,247,190 A | 9/1993 | Friend et al. |
| 5,257,486 A | 11/1993 | Holmwall |
| 5,265,008 A | 11/1993 | Benton et al. |
| 5,276,311 A | 1/1994 | Hartmut |
| 5,287,268 A | 2/1994 | McCarthy |
| 5,287,269 A | 2/1994 | Dorrough et al. |
| 5,297,026 A | 3/1994 | Hoffman |
| 5,305,196 A | 4/1994 | Deaton et al. |
| 5,311,594 A | 5/1994 | Penzias |
| 5,326,959 A | 7/1994 | Perazza |
| 5,327,508 A | 7/1994 | Deaton et al. |
| 5,328,809 A | 7/1994 | Holmes et al. |
| 5,339,239 A | 9/1994 | Manabe et al. |
| 5,350,906 A | 9/1994 | Brody et al. |
| 5,351,187 A | 9/1994 | Hassett |
| 5,352,877 A | 10/1994 | Morley |
| 5,359,183 A | 10/1994 | Skodlar |
| 5,380,046 A | 1/1995 | Stephens |
| 5,382,784 A | 1/1995 | Eberhardt |
| 5,383,113 A | 1/1995 | Knight |
| 5,383,687 A | 1/1995 | Suess et al. |
| 5,388,165 A | 2/1995 | Gabriel |
| 5,399,502 A | 3/1995 | Friend et al. |
| 5,401,827 A | 3/1995 | Holmes et al. |
| RE34,915 E | 4/1995 | Nichtberger et al. |
| 5,409,092 A | 4/1995 | Itako et al. |
| 5,430,644 A | 4/1995 | Deaton et al. |
| 5,412,190 A | 5/1995 | Kopesec |
| 5,412,192 A | 5/1995 | Hoss |
| 5,413,341 A | 5/1995 | Lieberman |

(56) References Cited

U.S. PATENT DOCUMENTS

| | | |
|---|---|---|
| 5,428,684 A | 6/1995 | Akiyama et al. |
| 5,432,326 A | 7/1995 | Noblett et al. |
| 5,440,108 A | 8/1995 | Tran et al. |
| 5,444,794 A | 8/1995 | Uhland |
| 5,448,471 A | 9/1995 | Deaton et al. |
| 5,450,491 A | 9/1995 | McNair |
| 5,453,601 A | 9/1995 | Rosen |
| 5,455,407 A | 10/1995 | Rosen |
| 5,466,920 A | 11/1995 | Nair et al. |
| 5,477,040 A | 12/1995 | Lalonde |
| 5,479,494 A | 12/1995 | Clitherow |
| 5,481,094 A | 1/1996 | Suda |
| 5,483,445 A | 1/1996 | Pickering |
| 5,489,123 A | 2/1996 | Roshkoff |
| 5,495,981 A | 3/1996 | Warther |
| 5,500,890 A | 3/1996 | Rogge et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,235 A | 6/1996 | Stefik et al. |
| 5,532,689 A | 7/1996 | Bueno |
| 5,537,314 A | 7/1996 | Kanter |
| 5,539,825 A | 7/1996 | Akiyama et al. |
| 5,541,583 A | 7/1996 | Mandelbaum |
| 5,544,086 A | 8/1996 | Davis et al. |
| 5,544,246 A | 8/1996 | Mandelbaum et al. |
| 5,546,446 A | 8/1996 | Tsunokawa et al. |
| 5,557,092 A | 9/1996 | Ackley et al. |
| 5,557,516 A | 9/1996 | Hogan |
| 5,563,934 A | 10/1996 | Eda |
| 5,572,004 A | 11/1996 | Raimann |
| 5,577,109 A | 11/1996 | Stimson et al. |
| 5,581,064 A | 12/1996 | Riley et al. |
| 5,583,933 A | 12/1996 | Mark |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,609,253 A | 3/1997 | Goade, Sr. |
| 5,612,868 A | 3/1997 | Off |
| 5,617,474 A | 4/1997 | Ditzig et al. |
| 5,621,787 A | 4/1997 | McKoy et al. |
| 5,621,812 A | 4/1997 | Deaton et al. |
| 5,649,114 A | 4/1997 | Deaton et al. |
| 5,642,485 A | 5/1997 | Deaton et al. |
| 5,638,457 A | 6/1997 | Deaton et al. |
| 5,642,279 A | 6/1997 | Stone |
| 5,644,723 A | 7/1997 | Deaton et al. |
| 5,644,727 A | 7/1997 | Atkins |
| 5,649,117 A | 7/1997 | Landry |
| 5,649,118 A | 7/1997 | Carlisle et al. |
| 5,650,604 A | 7/1997 | Marcous et al. |
| 5,652,786 A | 7/1997 | Rogers |
| 5,653,914 A | 8/1997 | Holmes et al. |
| 5,659,469 A | 8/1997 | Deaton et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,521 A | 10/1997 | Garrou |
| 5,677,955 A | 10/1997 | Doggett et al. |
| 5,680,459 A | 10/1997 | Hook et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,698,837 A | 12/1997 | Furuta |
| 5,699,528 A | 12/1997 | Hogan |
| 5,704,044 A | 12/1997 | Tarter et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,399 A | 2/1998 | Bezos |
| 5,717,925 A | 2/1998 | Harper et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,732,136 A | 3/1998 | Murphree et al. |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,744,787 A | 4/1998 | Teicher |
| 5,745,049 A | 4/1998 | Akiyama et al. |
| 5,745,555 A | 4/1998 | Mark |
| 5,745,706 A | 4/1998 | Wolfberg et al. |
| 5,748,737 A | 5/1998 | Daggar |
| 5,749,075 A | 5/1998 | Toader et al. |
| 5,760,381 A | 6/1998 | Stich et al. |
| 5,765,138 A | 6/1998 | Aycock et al. |
| 5,770,843 A | 6/1998 | Rose et al. |
| 5,770,849 A | 6/1998 | Novis et al. |
| 5,774,882 A | 6/1998 | Keen |
| 5,777,306 A | 7/1998 | Masuda |
| 5,777,903 A | 7/1998 | Piosenka et al. |
| 5,778,067 A | 7/1998 | Jones et al. |
| 5,787,403 A | 7/1998 | Randle |
| 5,789,732 A | 8/1998 | McMahon et al. |
| 5,789,733 A | 8/1998 | Jachimowicz et al. |
| 5,794,207 A | 8/1998 | Walker |
| 5,796,827 A | 8/1998 | Coppersmith et al. |
| 5,797,133 A | 8/1998 | Jones |
| 5,799,087 A | 8/1998 | Rosen |
| 5,802,176 A | 9/1998 | Audebert |
| 5,805,719 A | 9/1998 | Pare et al. |
| 5,806,044 A | 9/1998 | Powell |
| 5,806,045 A | 9/1998 | Biorge |
| 5,806,047 A | 9/1998 | Hackel et al. |
| 5,807,627 A | 9/1998 | Friend et al. |
| 5,809,478 A | 9/1998 | Greco |
| 5,815,657 A | 9/1998 | Williams et al. |
| 5,815,658 A | 9/1998 | Kuriyama |
| 5,819,234 A | 10/1998 | Slavin et al. |
| 5,819,237 A | 10/1998 | Garman |
| 5,825,871 A | 10/1998 | Mark |
| 5,832,090 A | 11/1998 | Raspotnik |
| 5,832,457 A | 11/1998 | O'Brien |
| 5,832,488 A | 11/1998 | Eberhardt |
| 5,835,061 A | 11/1998 | Stewart |
| 5,839,113 A | 11/1998 | Federau et al. |
| 5,842,421 A | 12/1998 | Desilets et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,175 A | 1/1999 | Day |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,456 A | 2/1999 | Rogers |
| 5,870,721 A | 2/1999 | Norris |
| 5,875,437 A | 2/1999 | Atkins |
| 5,877,975 A | 3/1999 | Jigour et al. |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |

(56) References Cited

U.S. PATENT DOCUMENTS

| | | |
|---|---|---|
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| 5,897,620 A | 4/1999 | Walker et al. |
| 5,901,303 A | 5/1999 | Chew |
| 5,903,879 A | 5/1999 | Mitchell |
| 5,905,246 A | 5/1999 | Fajkowski |
| 5,907,142 A | 5/1999 | Kelsey |
| 5,907,831 A | 5/1999 | Lotvin et al. |
| 5,911,135 A | 6/1999 | Atkins |
| 5,911,136 A | 6/1999 | Atkins |
| 5,918,211 A | 6/1999 | Sloane |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,792 A | 7/1999 | Koppes et al. |
| 5,928,082 A | 7/1999 | Clapper, Jr. |
| 5,930,217 A | 7/1999 | Kayanuma |
| 5,931,764 A | 8/1999 | Freeman et al. |
| 5,933,812 A | 8/1999 | Meyer et al. |
| 5,933,817 A | 8/1999 | Hucal |
| 5,936,221 A | 8/1999 | Corder et al. |
| 5,937,068 A | 8/1999 | Audebert |
| 5,940,811 A | 8/1999 | Norris |
| 5,949,044 A | 9/1999 | Walker et al. |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,956,711 A | 9/1999 | Sullivan et al. |
| 5,960,411 A | 9/1999 | Hartman et al. |
| 5,963,648 A | 10/1999 | Rosen |
| 5,963,925 A | 10/1999 | Kolling et al. |
| 5,970,469 A | 10/1999 | Scroggie et al. |
| 5,970,478 A | 10/1999 | Walker et al. |
| 5,970,479 A | 10/1999 | Shepherd |
| 5,970,480 A | 10/1999 | Kalina |
| 5,974,399 A | 10/1999 | Giuliani et al. |
| RE36,365 E | 11/1999 | Levine et al. |
| 5,979,757 A | 11/1999 | Tracy |
| 5,984,180 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,736 A | 11/1999 | Ferguson et al. |
| 5,991,743 A | 11/1999 | Irving et al. |
| 5,991,748 A | 11/1999 | Taskett |
| 5,991,750 A | 11/1999 | Watson |
| 6,003,762 A | 11/1999 | Hayashida |
| 5,999,596 A | 12/1999 | Walker et al. |
| 5,999,624 A | 12/1999 | Hopkins |
| 5,999,917 A | 12/1999 | Facciani et al. |
| 6,000,608 A | 12/1999 | Dorf |
| 6,000,832 A | 12/1999 | Franklin et al. |
| 6,002,383 A | 12/1999 | Shimada |
| 6,004,681 A | 12/1999 | Epstein et al. |
| 6,006,205 A | 12/1999 | Loeb et al. |
| 6,006,988 A | 12/1999 | Behrmann et al. |
| 6,009,411 A | 12/1999 | Kepecs |
| 6,009,412 A * | 12/1999 | Storey ................. 705/14.27 |
| 6,009,415 A | 12/1999 | Shurling et al. |
| 6,012,049 A | 1/2000 | Kawan |
| 6,014,634 A | 1/2000 | Scroggie et al. |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,482 A | 1/2000 | Molinari et al. |
| 6,016,954 A | 1/2000 | Abe et al. |
| 6,018,718 A * | 1/2000 | Walker et al. ......... 705/14.17 |
| 6,019,284 A | 2/2000 | Freeman et al. |
| 6,021,189 A | 2/2000 | Vu |
| 6,024,286 A | 2/2000 | Bradley et al. |
| 6,025,283 A | 2/2000 | Roberts |
| 6,026,370 A | 2/2000 | Jermyn |
| 6,029,139 A | 2/2000 | Cunningham et al. |
| 6,029,153 A | 2/2000 | Bauchner et al. |
| 6,029,890 A | 2/2000 | Austin |
| 6,032,136 A | 2/2000 | Brake, Jr. et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,045,042 A | 4/2000 | Ohno |
| 6,045,050 A | 4/2000 | Ippolito et al. |
| 6,047,067 A | 4/2000 | Rosen |
| 6,047,268 A | 4/2000 | Bartoli et al. |
| 6,048,271 A | 4/2000 | Barcelou |
| 6,049,463 A | 4/2000 | O'Malley et al. |
| 6,049,773 A | 4/2000 | McCormack et al. |
| 6,049,782 A | 4/2000 | Gottesman et al. |
| 6,055,573 A | 4/2000 | Gardenswartz et al. |
| 6,058,378 A | 5/2000 | Clark et al. |
| 6,061,660 A * | 5/2000 | Eggleston ............. G06Q 30/02 705/14.12 |
| 6,064,985 A | 5/2000 | Anderson |
| 6,065,675 A | 5/2000 | Teicher |
| 6,068,183 A | 5/2000 | Freeman et al. |
| 6,070,067 A | 5/2000 | Nguyen et al. |
| 6,070,147 A | 5/2000 | Harms et al. |
| 6,070,153 A | 5/2000 | Simpson |
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,085,976 A | 7/2000 | Scher |
| 6,089,284 A | 7/2000 | Kaehler et al. |
| 6,091,817 A | 7/2000 | Bertina et al. |
| 6,092,056 A | 7/2000 | Tull, Jr. et al. |
| 6,092,057 A | 7/2000 | Zimmerman et al. |
| 6,095,412 A | 8/2000 | Bettina et al. |
| 6,095,416 A | 8/2000 | Grant et al. |
| 6,098,053 A | 8/2000 | Slater |
| 6,105,006 A | 8/2000 | Davis et al. |
| 6,105,007 A | 8/2000 | Norris |
| 6,105,008 A | 8/2000 | Davis et al. |
| 6,105,009 A | 8/2000 | Cuervo |
| 6,105,011 A | 8/2000 | Morrison, Jr. |
| 6,105,865 A | 8/2000 | Hardesty |
| 6,108,642 A | 8/2000 | Findley |
| 6,112,190 A | 8/2000 | Fletcher et al. |
| 6,115,458 A | 9/2000 | Taskett |
| 6,119,932 A | 9/2000 | Maloney et al. |
| 6,119,933 A | 9/2000 | Wong et al. |
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,134,309 A | 10/2000 | Carson |
| 6,134,536 A | 10/2000 | Shepherd |
| 6,138,911 A | 10/2000 | Fredregill et al. |
| 6,138,917 A | 10/2000 | Chapin, Jr. |
| 6,141,666 A | 10/2000 | Tobin |
| 6,142,640 A | 11/2000 | Schofield |
| 6,144,848 A | 11/2000 | Walsh et al. |
| 6,145,741 A | 11/2000 | Wisdom et al. |
| 6,148,293 A | 11/2000 | King |
| 6,148,297 A | 11/2000 | Swor et al. |
| 6,161,096 A | 12/2000 | Bell |
| 6,163,770 A | 12/2000 | Gamble et al. |
| 6,163,771 A | 12/2000 | Walker et al. |
| 6,164,533 A | 12/2000 | Barton |
| 6,164,548 A | 12/2000 | Curiel |
| 6,167,385 A | 12/2000 | Hartley-Urquhart |
| 6,169,974 B1 | 1/2001 | Baumgartner et al. |
| 6,169,975 B1 | 1/2001 | White et al. |
| 6,173,267 B1 | 1/2001 | Cairns |
| 6,178,408 B1 | 1/2001 | Copple et al. |
| 6,179,211 B1 | 1/2001 | Green et al. |
| 6,182,048 B1 | 1/2001 | Osborn et al. |
| 6,182,059 B1 | 1/2001 | Angotti et al. |

(56) References Cited

U.S. PATENT DOCUMENTS

| | | |
|---|---|---|
| 6,182,894 B1 | 2/2001 | Hackett et al. |
| 6,185,541 B1 | 2/2001 | Scroggie et al. |
| 6,186,793 B1 | 2/2001 | Brubaker |
| 6,188,309 B1 | 2/2001 | Levine |
| 6,189,787 B1 | 2/2001 | Dorf |
| 6,192,142 B1 | 2/2001 | Pare, Jr. et al. |
| 6,195,644 B1 | 2/2001 | Bowie |
| 6,202,053 B1 | 3/2001 | Christiansen et al. |
| RE37,122 E | 4/2001 | Levine et al. |
| 6,222,914 B1 | 4/2001 | McMullin |
| 6,227,445 B1 | 5/2001 | Brookner |
| 6,227,447 B1 | 5/2001 | Campisano |
| 6,227,972 B1 | 5/2001 | Walker et al. |
| 6,243,688 B1 | 6/2001 | Kalina |
| 6,243,689 B1 | 6/2001 | Norton |
| 6,263,316 B1 | 7/2001 | Khan et al. |
| 6,265,977 B1 | 7/2001 | Vega et al. |
| 6,267,292 B1 | 7/2001 | Walker et al. |
| 6,278,981 B1 | 8/2001 | Dembo et al. |
| 6,278,996 B1 | 8/2001 | Richardson et al. |
| 6,282,516 B1 | 8/2001 | Giullani |
| 6,282,522 B1 | 8/2001 | Davis et al. |
| 6,289,322 B1 | 9/2001 | Kitchen et al. |
| 6,289,324 B1 | 9/2001 | Kawan |
| 6,292,786 B1 | 9/2001 | Deaton et al. |
| 6,295,522 B1 | 9/2001 | Boesch |
| 6,298,336 B1 | 10/2001 | Davis et al. |
| 6,302,444 B1 | 10/2001 | Cobben |
| 6,308,268 B1 | 10/2001 | Audebert |
| 6,308,887 B1 | 10/2001 | Korman et al. |
| 6,315,193 B1 | 11/2001 | Hogan |
| 6,315,195 B1 | 11/2001 | Ramachandran |
| 6,315,196 B1 | 11/2001 | Bachman |
| 6,321,211 B1 | 11/2001 | Dodd |
| 6,324,526 B1 | 11/2001 | D'Agostino |
| 6,327,573 B1 | 12/2001 | Walker et al. |
| 6,327,575 B1 | 12/2001 | Katz |
| 6,330,543 B1 | 12/2001 | Kepecs |
| 6,332,126 B1 | 12/2001 | Peirce et al. |
| 6,334,108 B1 | 12/2001 | Deaton et al. |
| 6,336,099 B1 | 1/2002 | Barnett et al. |
| 6,341,724 B2 | 1/2002 | Campisano |
| 6,343,743 B1 | 2/2002 | Lamla |
| 6,344,108 B1 | 2/2002 | Von Medvey et al. |
| 6,345,261 B1 | 2/2002 | Feidelson et al. |
| 6,345,766 B1 | 2/2002 | Taskett et al. |
| 6,349,290 B1 | 2/2002 | Horowitz et al. |
| 6,349,291 B1 | 2/2002 | Varma |
| 6,349,972 B1 | 2/2002 | Geiger et al. |
| 6,351,735 B1 | 2/2002 | Deaton et al. |
| 6,356,881 B1 | 3/2002 | Milch et al. |
| 6,360,209 B1 | 3/2002 | Loeb et al. |
| 6,360,954 B1 | 3/2002 | Barnardo |
| 6,366,220 B1 | 4/2002 | Elliott |
| 6,366,967 B1 | 4/2002 | Wagner |
| 6,373,969 B1 | 4/2002 | Adler |
| 6,377,669 B1 | 4/2002 | Walker et al. |
| 6,377,935 B1 | 4/2002 | Deaton et al. |
| 6,382,677 B1 | 5/2002 | Kaule et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,404,866 B1 | 6/2002 | Hopper et al. |
| 6,405,175 B1 | 6/2002 | Ng |
| 6,405,181 B2 | 6/2002 | Lent et al. |
| 6,405,182 B1 | 6/2002 | Cuervo |
| 6,409,080 B2 | 6/2002 | Kawagishi |
| 6,409,593 B1 | 6/2002 | Petrecca |
| 6,411,947 B1 | 6/2002 | Rice et al. |
| 6,419,161 B1 | 7/2002 | Haddad |
| 6,422,459 B1 | 7/2002 | Kawan |
| 6,422,462 B1 | 7/2002 | Cohen |
| 6,424,029 B1 | 7/2002 | Giesler |
| 6,424,947 B1 | 7/2002 | Tsuria et al. |
| 6,424,949 B1 | 7/2002 | Deaton et al. |
| 6,424,951 B1 | 7/2002 | Shurling et al. |
| 6,429,927 B1 | 8/2002 | Borza |
| 6,434,259 B1 | 8/2002 | Hamid et al. |
| 6,434,534 B1 | 8/2002 | Walker et al. |
| 6,446,210 B1 | 9/2002 | Borza |
| 6,450,407 B1 | 9/2002 | Freeman et al. |
| 6,454,647 B1 | 9/2002 | Woodbury, Jr. |
| 6,456,981 B1 | 9/2002 | Dejaeger et al. |
| 6,463,039 B1 | 10/2002 | Ricci et al. |
| 6,467,684 B2 | 10/2002 | Fite et al. |
| 6,470,306 B1 | 10/2002 | Pringle et al. |
| 6,471,128 B1 | 10/2002 | Corcoran et al. |
| 6,473,500 B1 | 10/2002 | Risafi et al. |
| 6,484,144 B2 | 11/2002 | Martin et al. |
| 6,484,146 B2 | 11/2002 | Day et al. |
| 6,484,148 B1 | 11/2002 | Boyd |
| 6,488,206 B1 | 12/2002 | Flaig et al. |
| 6,490,568 B1 | 12/2002 | Omara et al. |
| 6,491,782 B1 | 12/2002 | Jaynes |
| 6,498,861 B1 | 12/2002 | Hamid et al. |
| 6,505,168 B1 | 1/2003 | Rothman et al. |
| 6,507,644 B1 | 1/2003 | Henderson et al. |
| 6,513,019 B2 | 1/2003 | Lewis |
| 6,516,302 B1 | 2/2003 | Deaton et al. |
| 6,553,113 B1 | 4/2003 | Dhir et al. |
| 6,557,039 B1 | 4/2003 | Leong et al. |
| 6,558,255 B2 | 5/2003 | Walker et al. |
| 6,560,578 B2 | 5/2003 | Eldering |
| 6,560,581 B1 | 5/2003 | Fox et al. |
| 6,561,657 B1 | 5/2003 | Schofield |
| 6,564,189 B1 | 5/2003 | Nycz |
| 6,567,786 B1 | 5/2003 | Bibelnieks et al. |
| 6,567,791 B2 | 5/2003 | Lent et al. |
| 6,571,216 B1 | 5/2003 | Garg et al. |
| 6,574,603 B1 | 6/2003 | Dickson et al. |
| 6,575,361 B1 | 6/2003 | Graves et al. |
| 6,578,012 B1 | 6/2003 | Storey |
| 6,581,831 B2 | 6/2003 | Madani |
| 6,581,839 B1 | 6/2003 | Lasch et al. |
| 6,581,845 B2 | 6/2003 | Ye |
| 6,592,044 B1 | 7/2003 | Wong et al. |
| 6,594,640 B1 * | 7/2003 | Postrel ................ 705/14.27 |
| 6,595,342 B1 | 7/2003 | Maritzen et al. |
| 6,601,040 B1 | 7/2003 | Kolls |
| 6,601,761 B1 | 8/2003 | Katis |
| 6,607,127 B2 | 8/2003 | Wong |
| 6,609,104 B1 | 8/2003 | Deaton et al. |
| 6,609,111 B1 | 8/2003 | Bell |
| 6,609,113 B1 | 8/2003 | O'Leary et al. |
| 6,609,654 B1 | 8/2003 | Anderson et al. |
| 6,609,658 B1 | 8/2003 | Sehr |
| 6,611,811 B1 | 8/2003 | Deaton et al. |
| 6,611,819 B1 | 8/2003 | Oneda |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,644,551 B2 | 11/2003 | Clayman et al. |
| 6,647,374 B2 | 11/2003 | Kansal |
| 6,647,376 B1 | 11/2003 | Farrar et al. |
| 6,655,587 B2 | 12/2003 | Andrews et al. |
| 6,655,598 B2 | 12/2003 | Curiel |
| 6,659,259 B2 | 12/2003 | Knox et al. |
| 6,662,215 B1 | 12/2003 | Moskowitz et al. |
| 6,665,687 B1 | 12/2003 | Burke |
| D485,573 S | 1/2004 | Li |
| 6,675,127 B2 | 1/2004 | LaBlanc et al. |
| 6,684,195 B1 | 1/2004 | Deaton et al. |
| 6,687,222 B1 | 2/2004 | Albert et al. |
| 6,693,544 B1 | 2/2004 | Hebbecker |
| 6,697,799 B1 | 2/2004 | Neal et al. |
| 6,705,518 B2 | 3/2004 | Park et al. |
| 6,714,919 B1 | 3/2004 | Findley |
| 6,715,797 B2 | 4/2004 | Curiel |

(56) References Cited

U.S. PATENT DOCUMENTS

| | | |
|---|---|---|
| 6,718,313 B1 | 4/2004 | Lent et al. |
| 6,721,743 B1 | 4/2004 | Sakakibara |
| 6,726,813 B2 | 4/2004 | Kaule et al. |
| 6,727,802 B2 | 4/2004 | Kelly et al. |
| 6,742,125 B1 | 5/2004 | Gabber et al. |
| 6,742,704 B2 | 6/2004 | Fitzmaurice et al. |
| 6,745,938 B2 | 6/2004 | Sullivan |
| 6,754,640 B2 | 6/2004 | Bozeman |
| 6,764,014 B2 | 7/2004 | Lasch et al. |
| D495,736 S | 9/2004 | Scharf |
| 6,793,131 B2 | 9/2004 | Hogan |
| 6,793,135 B1 | 9/2004 | Ryoo |
| 6,795,809 B2 | 9/2004 | O'Brien et al. |
| 6,795,812 B1 | 9/2004 | Lent et al. |
| 6,802,008 B1 | 10/2004 | Ikefuji et al. |
| 6,804,786 B1 | 10/2004 | Chamley et al. |
| 6,805,287 B2 | 10/2004 | Bishop |
| 6,805,288 B2 | 10/2004 | Routhenstein et al. |
| 6,805,289 B2 | 10/2004 | Noriega et al. |
| 6,814,282 B2 | 11/2004 | Seifert et al. |
| 6,817,008 B2 | 11/2004 | Leford et al. |
| 6,819,748 B2 | 11/2004 | Matada |
| 6,820,061 B2 | 11/2004 | Postrel |
| 6,829,586 B2 | 12/2004 | Postrel |
| 6,834,796 B2 | 12/2004 | Anvekar et al. |
| 6,842,739 B2 | 1/2005 | Postrel |
| 6,845,906 B2 | 1/2005 | Royer et al. |
| 6,857,566 B2 | 2/2005 | Wankmueller |
| 6,865,547 B1 | 3/2005 | Brake, Jr. et al. |
| 6,868,426 B1 | 3/2005 | Mankoff |
| 6,871,174 B1 | 3/2005 | Dolan et al. |
| 6,874,139 B2 | 3/2005 | Krueger et al. |
| 6,876,971 B1 | 4/2005 | Burke |
| 6,880,084 B1 | 4/2005 | Brittenham et al. |
| 6,885,994 B1 | 4/2005 | Scroggie et al. |
| 6,886,046 B2 | 4/2005 | Stutz et al. |
| D505,450 S | 5/2005 | Lauer et al. |
| 6,886,741 B1 | 5/2005 | Salveson |
| 6,889,198 B2 | 5/2005 | Kawan |
| 6,892,187 B2 | 5/2005 | Phillips et al. |
| 6,901,372 B1 | 5/2005 | Helzerman |
| 6,901,375 B2 | 5/2005 | Fernandez |
| 6,901,406 B2 | 5/2005 | Nabe et al. |
| 6,913,193 B1 | 7/2005 | Kawan |
| 6,915,271 B1 | 7/2005 | Meyer et al. |
| 6,920,611 B1 | 7/2005 | Spaeth et al. |
| 6,924,026 B2 | 8/2005 | Jaynes |
| 6,931,382 B2 | 8/2005 | Large et al. |
| 6,938,156 B2 | 8/2005 | Wheeler et al. |
| 6,942,156 B2 | 9/2005 | Ohta et al. |
| 6,942,569 B2 | 9/2005 | Petrecca |
| 6,945,453 B1 | 9/2005 | Schwarz, Jr. |
| 6,947,898 B2 | 9/2005 | Postrel |
| 6,950,940 B2 | 9/2005 | Wheeler et al. |
| 6,954,741 B1 | 10/2005 | Burchetta et al. |
| 6,961,710 B1 | 11/2005 | Yanagisawa et al. |
| 6,963,857 B1 | 11/2005 | Johnson |
| 6,965,868 B1 * | 11/2005 | Bednarek ............... 705/7.14 |
| 6,968,348 B1 | 11/2005 | Carone et al. |
| 6,985,873 B2 | 1/2006 | Sullivan |
| 6,985,879 B2 | 1/2006 | Walker et al. |
| 6,999,569 B2 | 2/2006 | Risafi et al. |
| 6,999,938 B1 | 2/2006 | Libman |
| 7,003,476 B1 | 2/2006 | Samra et al. |
| 7,006,979 B1 | 2/2006 | Samra et al. |
| 7,006,983 B1 | 2/2006 | Packes et al. |
| 7,006,992 B1 | 2/2006 | Packwood |
| 7,010,495 B1 | 3/2006 | Samra et al. |
| 7,014,110 B2 | 3/2006 | Minowa et al. |
| 7,024,374 B1 | 4/2006 | Day et al. |
| 7,025,256 B1 | 4/2006 | Drummond et al. |
| 7,031,908 B1 | 4/2006 | Huang et al. |
| 7,031,939 B1 | 4/2006 | Gallagher et al. |
| 7,039,600 B1 | 5/2006 | Meek et al. |
| 7,047,222 B1 | 5/2006 | Bush |
| 7,050,996 B1 | 5/2006 | Blagg et al. |
| 7,051,001 B1 | 5/2006 | Slater |
| 7,051,929 B2 | 5/2006 | Li |
| 7,054,842 B2 | 5/2006 | James et al. |
| 7,063,924 B2 | 6/2006 | Kaminsky et al. |
| 7,066,382 B2 | 6/2006 | Kaplan |
| 7,069,244 B2 | 6/2006 | Strayer et al. |
| 7,070,095 B1 | 7/2006 | Gandel et al. |
| 7,076,458 B2 | 7/2006 | Lawlor et al. |
| 7,076,465 B1 | 7/2006 | Blagg et al. |
| 7,082,416 B2 | 7/2006 | Anderson |
| 7,083,084 B2 | 8/2006 | Graves et al. |
| 7,089,202 B1 | 8/2006 | McNamar et al. |
| 7,090,138 B2 | 8/2006 | Rettenmyer et al. |
| 7,092,916 B2 | 8/2006 | Diveley |
| 7,107,249 B2 | 9/2006 | Dively |
| 7,120,601 B2 | 10/2006 | Chen et al. |
| 7,121,471 B2 | 10/2006 | Beenau et al. |
| 7,128,272 B2 | 10/2006 | Doublet |
| 7,143,063 B2 | 11/2006 | Lent et al. |
| D533,220 S | 12/2006 | Graves et al. |
| 7,155,411 B1 * | 12/2006 | Blinn .................... G06Q 20/02 705/1.1 |
| 7,156,301 B1 | 1/2007 | Bonalle et al. |
| 7,163,153 B2 | 1/2007 | Blossom |
| 7,167,844 B1 | 1/2007 | Leong et al. |
| 7,171,385 B1 | 1/2007 | Dembo et al. |
| 7,184,973 B2 | 2/2007 | Monteleone et al. |
| D538,349 S | 3/2007 | Hollands |
| 7,191,952 B2 | 3/2007 | Blossom |
| 7,195,154 B2 | 3/2007 | Routhenstein |
| 7,216,099 B2 | 5/2007 | Chen et al. |
| 7,228,155 B2 | 6/2007 | Saunders |
| 7,239,226 B2 | 7/2007 | Berardi et al. |
| 7,243,839 B2 | 7/2007 | Beck et al. |
| 7,249,097 B2 | 7/2007 | Hutchison et al. |
| 7,249,099 B2 | 7/2007 | Ling |
| 7,249,112 B2 | 7/2007 | Berardi et al. |
| 7,216,091 B1 | 8/2007 | Blandina et al. |
| 7,252,223 B2 | 8/2007 | Schofield |
| 7,252,226 B2 | 8/2007 | Risafi et al. |
| 7,254,560 B2 | 8/2007 | Singhal |
| 7,260,549 B2 | 8/2007 | Spielmann et al. |
| D551,705 S | 9/2007 | Mershon |
| 7,266,524 B1 | 9/2007 | Butcher, III |
| 7,269,737 B2 | 9/2007 | Robinson |
| 7,275,160 B2 | 9/2007 | Pearson et al. |
| 7,295,999 B1 | 11/2007 | Simon et al. |
| 7,306,141 B1 | 12/2007 | Schwarz, Jr. |
| 7,306,163 B2 | 12/2007 | Scholz et al. |
| 7,310,617 B1 | 12/2007 | Cunningham |
| 7,311,244 B1 | 12/2007 | Schwarz, Jr. |
| 7,312,707 B1 | 12/2007 | Bishop et al. |
| 7,315,843 B2 | 1/2008 | Diveley et al. |
| 7,318,049 B2 | 1/2008 | Iannacci |
| 7,333,948 B2 | 2/2008 | Bell et al. |
| 7,340,431 B1 | 3/2008 | McManus et al. |
| 7,346,562 B2 | 3/2008 | Inoue et al. |
| 7,346,567 B2 | 3/2008 | Weeks |
| 7,349,866 B2 | 3/2008 | Schwarz, Jr. |
| 7,356,516 B2 | 4/2008 | Richey et al. |
| 7,357,331 B2 | 4/2008 | Blossom |
| 7,359,880 B2 | 4/2008 | Abel et al. |
| 7,360,693 B1 | 4/2008 | Sullivan |
| 7,370,004 B1 | 5/2008 | Patel et al. |
| 7,392,221 B2 | 6/2008 | Nabe et al. |
| 7,392,222 B1 | 6/2008 | Hamilton et al. |
| 7,392,224 B1 | 6/2008 | Bauer et al. |
| 7,398,241 B2 | 7/2008 | Fay et al. |
| 7,398,248 B2 | 7/2008 | Phillips et al. |
| 7,401,049 B2 | 7/2008 | Hobbs et al. |
| 7,401,731 B1 | 7/2008 | Pletz et al. |
| 7,461,028 B2 | 12/2008 | Wronski, Jr. |
| 7,467,096 B2 | 12/2008 | Antonucci et al. |
| 7,479,320 B2 | 1/2009 | Keller et al. |
| 7,493,288 B2 | 2/2009 | Biship et al. |
| 7,494,057 B2 | 2/2009 | Lasch et al. |
| 7,502,758 B2 | 3/2009 | Burke |
| 7,503,503 B2 | 3/2009 | Riedl et al. |

(56) References Cited

U.S. PATENT DOCUMENTS

| | | |
|---|---|---|
| 7,506,804 B2 | 3/2009 | Zajkowski et al. |
| 7,506,806 B2 | 3/2009 | Bonalle et al. |
| 7,512,551 B2 | 3/2009 | Postrel |
| 7,523,385 B2 | 4/2009 | Nguyen et al. |
| 7,530,491 B2 | 5/2009 | Lasch et al. |
| 7,580,857 B2 | 8/2009 | Vanfleet et al. |
| 7,587,363 B2 | 9/2009 | Cataline et al. |
| 7,588,184 B2 | 9/2009 | Gandel et al. |
| 7,591,416 B2 | 9/2009 | Blossom |
| 7,606,730 B2 | 10/2009 | Antonucci |
| 7,613,629 B2 | 11/2009 | Antonucci et al. |
| 7,630,935 B2 | 12/2009 | Loeger et al. |
| 7,640,205 B2 | 12/2009 | Michelassi et al. |
| 7,660,763 B1 | 2/2010 | Brake, Jr. et al. |
| 7,676,425 B1 | 3/2010 | Noles |
| 7,676,459 B2 | 3/2010 | Carone et al. |
| 7,686,218 B2 | 3/2010 | Hessburg et al. |
| 7,689,504 B2 | 3/2010 | Warren et al. |
| 7,707,111 B2 | 4/2010 | Brake, Jr. et al. |
| 7,729,925 B2 | 6/2010 | Maritzen et al. |
| 7,729,980 B2 | 6/2010 | Mittenzwei et al. |
| 7,742,970 B2 | 6/2010 | Thierer et al. |
| 7,747,463 B1 | 6/2010 | Phillips et al. |
| 7,753,259 B1 | 7/2010 | Taylor et al. |
| 2001/0011243 A1 | 8/2001 | Dembo et al. |
| 2001/0027389 A1 | 10/2001 | Beverina et al. |
| 2001/0027441 A1 | 10/2001 | Wankmueller |
| 2001/0034647 A1 | 10/2001 | Marks et al. |
| 2001/0034682 A1 | 10/2001 | Knight et al. |
| 2001/0037241 A1* | 11/2001 | Puri ............... 705/14 |
| 2001/0037315 A1 | 11/2001 | Saliba et al. |
| 2001/0044293 A1 | 11/2001 | Morgan |
| 2001/0047342 A1 | 11/2001 | Cuervo |
| 2001/0049632 A1 | 12/2001 | Rigole |
| 2001/0054003 A1 | 12/2001 | Chien et al. |
| 2001/0056398 A1 | 12/2001 | Scheirer |
| 2002/0019803 A1 | 2/2002 | Muller |
| 2002/0026418 A1 | 2/2002 | Koppel et al. |
| 2002/0046255 A1 | 4/2002 | Moore et al. |
| 2002/0062235 A1 | 5/2002 | Wahlbin et al. |
| 2002/0062249 A1 | 5/2002 | Iannacci |
| 2002/0065720 A1 | 5/2002 | Carswell et al. |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |
| 2002/0116330 A1 | 8/2002 | Hed et al. |
| 2002/0120627 A1 | 8/2002 | Mankoff |
| 2002/0120642 A1 | 8/2002 | Fetherston |
| 2002/0143614 A1* | 10/2002 | MacLean et al. ............... 705/14 |
| 2002/0143703 A1 | 10/2002 | Razvan et al. |
| 2002/0147662 A1 | 10/2002 | Anderson |
| 2002/0151359 A1* | 10/2002 | Rowe ............... 463/29 |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0178025 A1 | 11/2002 | Hansen et al. |
| 2002/0198803 A1* | 12/2002 | Rowe ............... G06Q 40/00 705/35 |
| 2003/0004828 A1 | 1/2003 | Epstein |
| 2003/0023549 A1 | 1/2003 | Armes et al. |
| 2003/0028483 A1 | 2/2003 | Sanders et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0040964 A1* | 2/2003 | Lacek ............... 705/14 |
| 2003/0046249 A1 | 3/2003 | Wu |
| 2003/0053609 A1 | 3/2003 | Risafi et al. |
| 2003/0061168 A1 | 3/2003 | Routhenstein |
| 2003/0069787 A1* | 4/2003 | Tendon ............... G06Q 30/02 705/14.28 |
| 2003/0074290 A1 | 4/2003 | Clore |
| 2003/0101119 A1 | 5/2003 | Persons et al. |
| 2003/0105672 A1 | 6/2003 | Epstein et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0158818 A1 | 8/2003 | George et al. |
| 2003/0163403 A1 | 8/2003 | Chen et al. |
| 2003/0163416 A1 | 8/2003 | Kitajima |
| 2003/0172040 A1 | 9/2003 | Kemper et al. |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0216965 A1 | 11/2003 | Libman |
| 2003/0220834 A1 | 11/2003 | Leung et al. |
| 2004/0024672 A1 | 2/2004 | Brake, Jr. et al. |
| 2004/0030626 A1 | 2/2004 | Libman |
| 2004/0039588 A1 | 2/2004 | Libman |
| 2004/0098351 A1 | 5/2004 | Duke |
| 2004/0103431 A1 | 5/2004 | Davenport et al. |
| 2004/0118914 A1 | 6/2004 | Smith et al. |
| 2004/0128195 A1 | 7/2004 | Sorem |
| 2004/0215507 A1 | 10/2004 | Levitt et al. |
| 2004/0243498 A1 | 12/2004 | Duke |
| 2005/0021400 A1 | 1/2005 | Postrel |
| 2005/0027649 A1 | 2/2005 | Cech |
| 2005/0035192 A1 | 2/2005 | Bonalle et al. |
| 2005/0071230 A1 | 3/2005 | Mankoff |
| 2005/0075932 A1 | 4/2005 | Mankoff |
| 2005/0091138 A1 | 4/2005 | Awatsu |
| 2005/0102228 A1 | 5/2005 | Srinivasan et al. |
| 2005/0108152 A1 | 5/2005 | Tsao Lee et al. |
| 2005/0167488 A1 | 8/2005 | Higgins et al. |
| 2005/0171839 A1 | 8/2005 | Corriere |
| 2005/0171842 A1 | 8/2005 | Tien et al. |
| 2005/0171898 A1 | 8/2005 | Bishop et al. |
| 2005/0171901 A1 | 8/2005 | Rosenblatt et al. |
| 2005/0177503 A1 | 8/2005 | Thomas |
| 2005/0177508 A1 | 8/2005 | Pembroke |
| 2005/0177523 A1 | 8/2005 | Weiss et al. |
| 2005/0179251 A1 | 8/2005 | Wagoner et al. |
| 2005/0182654 A1 | 8/2005 | Abolfathi et al. |
| 2005/0182735 A1 | 8/2005 | Zager et al. |
| 2005/0187820 A1 | 8/2005 | Mohan |
| 2005/0189427 A1 | 9/2005 | Brown et al. |
| 2005/0192862 A1 | 9/2005 | Modi |
| 2005/0197904 A1 | 9/2005 | Baron et al. |
| 2005/0199705 A1 | 9/2005 | Beck et al. |
| 2005/0199708 A1 | 9/2005 | Friedman |
| 2005/0203824 A1 | 9/2005 | Freud et al. |
| 2005/0203857 A1 | 9/2005 | Friedman |
| 2005/0205666 A1 | 9/2005 | Ward et al. |
| 2005/0206499 A1 | 9/2005 | Fisher |
| 2005/0209917 A1 | 9/2005 | Anderson et al. |
| 2005/0216346 A1 | 9/2005 | Kusumoto et al. |
| 2005/0216888 A1 | 9/2005 | Drummond et al. |
| 2005/0222906 A1 | 10/2005 | Chen |
| 2005/0234769 A1 | 10/2005 | Jain et al. |
| 2005/0234771 A1 | 10/2005 | Register et al. |
| 2005/0234773 A1 | 10/2005 | Hirst et al. |
| 2005/0234789 A1 | 10/2005 | Czyzewski et al. |
| 2005/0240474 A1 | 10/2005 | Li |
| 2005/0240477 A1 | 10/2005 | Friday et al. |
| 2005/0242179 A1 | 11/2005 | Warwick |
| 2005/0246289 A1 | 11/2005 | Alexander et al. |
| 2005/0246627 A1 | 11/2005 | Sayed |
| 2005/0251446 A1 | 11/2005 | Jiang et al. |
| 2005/0251470 A1 | 11/2005 | Sullivan |
| 2005/0256794 A1 | 11/2005 | Colby |
| 2005/0256802 A1 | 11/2005 | Ammermann et al. |
| 2005/0261916 A1 | 11/2005 | McCall et al. |
| 2005/0261995 A1 | 11/2005 | Phelan |
| 2005/0267800 A1 | 12/2005 | Tietzen et al. |
| 2005/0269396 A1 | 12/2005 | Schofield |
| 2005/0273386 A1 | 12/2005 | Weidner |
| 2005/0273387 A1 | 12/2005 | Previdi |
| 2005/0273425 A1 | 12/2005 | Yamazaki |
| 2005/0278215 A1 | 12/2005 | Seele, Jr. |

(56) References Cited

U.S. PATENT DOCUMENTS

| | | |
|---|---|---|
| 2005/0283429 A1 | 12/2005 | Bates et al. |
| 2005/0288998 A1 | 12/2005 | Verma et al. |
| 2005/0289003 A1 | 12/2005 | Thompson et al. |
| 2005/0289044 A1 | 12/2005 | Breslin et al. |
| 2006/0004629 A1 | 1/2006 | Neemann et al. |
| 2006/0010033 A1 | 1/2006 | Thomas |
| 2006/0010034 A1 | 1/2006 | Sparks |
| 2006/0011719 A1 | 1/2006 | Lehtonen et al. |
| 2006/0015463 A1 | 1/2006 | Gupta et al. |
| 2006/0020507 A1 | 1/2006 | Sagey |
| 2006/0020542 A1 | 1/2006 | Litle |
| 2006/0026073 A1 | 2/2006 | Kenny et al. |
| 2006/0026092 A1 | 2/2006 | Klein et al. |
| 2006/0031718 A1 | 2/2006 | Thornhill et al. |
| 2006/0036543 A1 | 2/2006 | Blagg et al. |
| 2006/0039733 A1 | 2/2006 | Meyerhofer |
| 2006/0041540 A1 | 2/2006 | Shannon |
| 2006/0047573 A1 | 3/2006 | Mitchell et al. |
| 2006/0053056 A1 | 3/2006 | Alspach-Gross et al. |
| 2006/0064329 A1 | 3/2006 | Abolfathi et al. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0095350 A1 | 5/2006 | Hall et al. |
| 2006/0116903 A1 | 6/2006 | Becerra |
| 2006/0116995 A1 | 6/2006 | Strayer et al. |
| 2006/0131869 A1 | 6/2006 | Brignull |
| 2006/0143077 A1 | 6/2006 | Prorock |
| 2006/0143117 A1 | 6/2006 | Chigira et al. |
| 2006/0149671 A1 | 7/2006 | Nix et al. |
| 2006/0157557 A1 | 7/2006 | Lee et al. |
| 2006/0161478 A1 | 7/2006 | Turner et al. |
| 2006/0249574 A1 | 11/2006 | Brown et al. |
| 2006/0251478 A1 | 11/2006 | Desmeules |
| 2006/0259364 A1 | 11/2006 | Strock et al. |
| 2006/0259390 A1 | 11/2006 | Rosenberger |
| 2006/0261927 A1 | 11/2006 | Kelly et al. |
| 2006/0289636 A1 | 12/2006 | Hoblit |
| 2007/0020443 A1 | 1/2007 | Lo |
| 2007/0034700 A1 | 2/2007 | Poidomani et al. |
| 2007/0038515 A1 | 2/2007 | Postrel |
| 2007/0063025 A1 | 3/2007 | Blossom |
| 2007/0078719 A1* | 4/2007 | Schmitt ............... G06Q 30/02 705/14.25 |
| 2007/0118470 A1 | 5/2007 | Warren et al. |
| 2007/0124227 A1 | 5/2007 | Dembo |
| 2007/0136211 A1 | 6/2007 | Brown et al. |
| 2007/0156530 A1 | 7/2007 | Schmitt et al. |
| 2007/0203825 A1 | 8/2007 | Hanifin et al. |
| 2007/0208671 A1 | 9/2007 | Brown et al. |
| 2007/0215688 A1 | 9/2007 | Routhenstein |
| 2007/0226097 A1 | 9/2007 | Keechle |
| 2007/0265924 A1 | 11/2007 | Schwarz |
| 2008/0005018 A1 | 1/2008 | Powell |
| 2008/0010202 A1 | 1/2008 | Schwarz |
| 2008/0019281 A1 | 1/2008 | Liger et al. |
| 2008/0027841 A1 | 1/2008 | Eder |
| 2008/0133350 A1 | 6/2008 | White et al. |
| 2008/0177659 A1 | 7/2008 | Lacey et al. |
| 2008/0187770 A1 | 8/2008 | Funicelli et al. |
| 2008/0215470 A1 | 9/2008 | Sengupta et al. |
| 2008/0230600 A1 | 9/2008 | Black et al. |
| 2008/0245865 A1 | 10/2008 | Mosteller |
| 2008/0262915 A1 | 10/2008 | Gojkovic et al. |
| 2008/0277465 A1 | 11/2008 | Pletz et al. |
| 2008/0288396 A1 | 11/2008 | Siggers et al. |
| 2008/0301041 A1 | 12/2008 | Bruk |
| 2009/0043651 A1 | 2/2009 | Schwarz |
| 2009/0048972 A1 | 2/2009 | Bierer et al. |
| 2009/0112639 A1 | 4/2009 | Robinson Beaver |
| 2009/0150370 A1 | 6/2009 | Christensen et al. |
| 2009/0171778 A1 | 7/2009 | Powell |
| 2009/0230195 A1 | 9/2009 | Lasch et al. |
| 2009/0240620 A1 | 9/2009 | Kendrick et al. |
| 2009/0242645 A1 | 10/2009 | Komatsu et al. |
| 2009/0250522 A1 | 10/2009 | Williams et al. |
| 2009/0261161 A1 | 10/2009 | Blossom |
| 2009/0265275 A1 | 10/2009 | Everhart |
| 2009/0271853 A1 | 10/2009 | Everhart |
| 2009/0313106 A1 | 12/2009 | Taylor et al. |
| 2009/0313110 A1 | 12/2009 | Asai et al. |
| 2010/0030675 A1 | 2/2010 | Hanan et al. |
| 2010/0030697 A1 | 2/2010 | Goodrich et al. |
| 2010/0057551 A1 | 3/2010 | Blaisdell |
| 2010/0057553 A1 | 3/2010 | Ameiss et al. |
| 2010/0114779 A1 | 5/2010 | Noles |
| 2010/0153198 A1 | 6/2010 | Murphy et al. |
| 2012/0150609 A1 | 6/2012 | Walker et al. |
| 2012/0311617 A1 | 12/2012 | Walker et al. |
| 2016/0343023 A1* | 11/2016 | Sorem ................ G06Q 30/0231 |
| 2016/0350677 A1* | 12/2016 | Pathak ................ G06Q 50/20 |

FOREIGN PATENT DOCUMENTS

| | | |
|---|---|---|
| GB | 2275654 | 9/1994 |
| GB | 2376787 | 12/2002 |
| GB | 2377071 | 12/2002 |
| GB | 2377314 | 1/2003 |
| WO | WO 1994/029112 | 12/1994 |
| WO | WO 1997/041673 | 11/1997 |
| WO | WO 1998/058345 | 12/1998 |
| WO | WO 1998/059307 | 12/1998 |
| WO | WO 1999/005633 | 2/1999 |
| WO | WO 1999/054841 | 10/1999 |
| WO | WO 2001/69347 | 9/2001 |
| WO | WO 2005/043277 | 5/2005 |
| WO | WO 2008/021381 | 2/2008 |
| WO | WO 2008/021382 | 2/2008 |

OTHER PUBLICATIONS

Points.com website archived by the Way Back Machine, dated Apr. 11, 2001.*
"Associates First Capital Corporation", Hoover's Inc., The Industry Standard: The Newsmagazine of the Internet Economy, thestandard.net/companies/cpmpany-display, Apr. 6, 1999, 2 pages.
"The Evolution of a New Consumerism", Chain Store Age, vol. 73, 4 pages, Jun. 1997.
"Welcome to Swiftgift", Swiftgift, www.swiftgiftcard.com, Dec. 8, 1998, 10 pages.
5500—FDIC General Counsel's Opinion No. 8—Stored Value Cards, 61 Fed. Reg. 40490, http://www.fdic.gov/regulations/laws/rules/5500-500.html, Aug. 2, 1996.
Antoinette Coulton, "Incentives field moving to card-based series 14", American Banker, Mar. 26, 1998, 3 pages.
AT&T Marketing, "Universal card free lifetime membership extended 3 months", www.att.com/press/0297/970217.csa.html, Dec. 4, 1990, 2 pages.
AT&T News Release, New 1-800-CALL-ATT campaign promotes one number for all calls, Feb. 17, 1997, 2 pages.
Award Card Comparison, JA7922 (1995).
Bank, Cash, Check,Charge—What's Next?, Seattle Times, Mar. 6, 1995.
Beth Piskora, Debit Cards Seen Poised for New Markets, American Banker, Mar. 7, 1995, 1 page.
Blockbuster running test of a stored value card, The American Banker, Sep. 1, 1995.
Bogle, Mutual Funds at the Millennium: Fund Directors and Fund Myths, The Vanguard Group to the '40 Act Institute of PLI (Practicing Law Institute), New York, NY, May 15, 2000, 15 pages.
Brehl, Banks issue cash-card pledge, The Toronto Star, Oct. 9, 1997, 1 page.
Business Editors, Transmedia and United Airlines Partner to Enhance Mileage Plus Dining by iDine, Business Wire, p. 1 (2001).
Business Times, Electronic Purse Can Free You from ATM Drag, Business Times, www.brimes.co.za, printed Feb. 23, 2001, 1 page.
Card Based Award Systems, JA8309 (1995).
Card News, vol. 6, No. 25, "D.C. Area Safeway stores look for increase in sales volume and revenue with cards", Dec. 1991, 3 pages.

(56) References Cited

OTHER PUBLICATIONS

CardEx Incentives, Apr. 6, 1999, www.cardexco.com, 15 pages.
CardFlash, Apr. 5, 2005.
CESNaBANCO introduces stored value card technology blockbuster video is first merchant partner (1996).
Chain Store Age Executive with Shopping Center Age, "More retailers turn to co-branding", Feb. 1, 1995, v.71, n. 2, ISSN: 0193-1199, 3 pages.
Christine Dugas, Payroll May Ask: Paper or Plastic?, USA Today, 3B, Aug. 14, 2001.
Clark, Microsoft, Visa to Jointly Develop PC Electronic-Shopping Software, The Wall Street Journal, Nov. 9, 1994, Nov. 9, 1994 WSJ B9.
Common electronic purse specifications, Business Requirements, Version 6.0, Dec. 1998.
Consortium created to manage common electronic purse specification, Cardtech Securtech, Chicago, www.visa.com/av/news/PRmisc051199.vhtml, May 11, 1999.
Credit Card News, "A store card issuer looks for lift from electronic gift certificates", Feb. 1, 1995, 2 pages.
Debit Card News, vol. 2, Issue 2, "Boatmen's floats stored value into the employee incentive waters", Jul. 16, 1996, 3 pages.
Delta and American Express Introduce Always Double Miles Feature on Delta Skymiles® Cards, Oct. 2, 2000, PR Newswire, p. 1.
Edwards, ATMs The Hot New Media Buy, ABA Banking Journal, Mar. 1999, pp. 58, 60.
Electronic purse card to he launched tomorrow, New Straits Times, News Clippings, Sep. 18, 1999, printed Feb. 23, 2001, 3 pages.
Electronic Purse, SCIA (Smart Card Industry Association), About Smart Cards, www.scia.org, printed Feb. 23, 2001, 1 page.
Emerson Brown and Jim Baum, Purchasing Card Magic: Eli Lilly Finds Accounts Payable Flying High With Plastic, Corporate Cashflow, 4 pages.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
First Data markets stored-value cards, Cards International, Jan. 30, 1996, p. 5.
First Union Issues Smart Cards to Fort Benning Recruits, CardFax, 1 page.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached), First USA, 6 pages.
First USA Credit Card Statement from Jun. 10, 1999.
First USA Platinum Connect, First USA Bank, First USA Promotional Mailing, Oct. 1997, 6 pages.
Frequently asked questions, ECARD, www.eregard.com, printed Sep. 23, 2001, 7 pages.
Guidotti, Comparing Environmental risks: A Consultative Approach to Setting Priorities at the Community Level, Public Health Rev 1994, vol. 22, Jun. 16, 2005, pp. 321-337.
Hansell, Visa to unveil electronic purse cards, New York Times, printed Feb. 23, 2001, 2 pages.
Here's the calling convenience you asked for: 1-800-call-AT&T . . . for All Calls, Appendix A: for Card Carriers, 7 pages.
Here's the calling convenience you asked for: 1-800-call-ATT . . . for All Calls, AT&T, Appendix A: for Card Carriers, 1999, 7 pages.
Hoovers, General Mills, Inc. Corporate Profile relied upon to show the history of the company, http:/cobrands.hoovers.com/global/cobrands/proquest/history.xhtrnl?COID=10639, Jul. 12, 2005, 2 pages.
Hotchkiss, ATM's at the head of their class, Bank Marketing, vol. 29, No. 3, Mar. 1997, pp. 26-32.
How Is It Different?, JA8331(1995).
Incenticard, Bellsouth, JA8329 (1995).
Incentive Firms Find Debit Cards a Rewarding Experience, Debit Card News, v.3, n.11, Nov. 28, 1997, 3 pages.
Internat Archives WayBack Machine, Retrieved form the Internet at: www.deltaliveonline.net, Jan. 21, 2001.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 6 pages.
Jeffrey M. Lacker, "Stored Value Cards: Costly Private Substitutions for Government Currency", Economic Quarterly, 1996, 17 pages.
Key Bank Holiday Offer, http://www.key.com/swiftgift/home.html, printed Apr. 5, 1999.
Konrad, IBM Had a Bunch of Unusual Ideas in 2003, www.philly.com, printed Jan. 21, 2004, posted on Jan. 13, 2004, 2 pages.
Kutler, Cash Card Creator Looking Beyond Mondex, Feb. 9, 1995.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
Langheinrich et al., Unintrusive Customization Techniques for Web Advertising, Computer Networks, vol. 31, 1999, pp. 1259-1272.
Lisa Fickenscher, "Amex prepaid offering is latest card for firms regarding employees", American Banker, vol. 161, No. 151, 2 pages, Aug. 8, 1996.
Lucy Lzarony, "Stuck for a gift? Give a prepaid credit card", www.bankrate.com, Dec. 21, 1998, 2 pages.
Machlis et al., Will smart cards replace ATMS?, Computerworld, printed Feb. 23, 2001, 3 pages.
Machlis, Have it the smart way: Burger King program drives smart-card use, Computerworld, printed Feb. 23, 2001, 1 page.
MailFrontier Survey Finds that Consumers Hold Financial Institutions Accountable for Online Identitiy Theft, www.mailfrontier.com, Palo Alto, CA, Nov. 2004.
Meridian Award Cards, JA8251 (1995).
Meridian—the leader in card marketing, JA8343 (1995).
Meridicard vs. Debit Cards, JA7917 (1995).
Mickey Meece, "Boatman's prepaid cards for worker-incentive firm", American Banker, Jul. 2, 1996, 1 page.
Miller, Section E2.1: Kerberos Authentication and Authorization System, Project Athena, Cambridge, MA, Dec. 21, 1987, 39 pages.
Miriam Krenin Souccar, Smart Cards: 1st Union Smart Card Pilot Enlists a Second Army Base, American Banker, 3 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Morgan et al., Categorizing Risks for Risk Ranking, vol. 20, No. 1, Jun. 22, 2005, pp. 49-58.
Neumann, An Enhanced Neural Network Technique for Software Risk Analysis, IEEE Transactions on Software Engineering, vol. 28, No. 9, Sep. 1, 2002, pp. 904-912.
Nick Rosen, Cash Just Isn't Flexible Enough: Shops of the Future Will Only Take Cards, Daily Express: Technology Section, Feb. 10, 1995, 1 page.
Norris, First data unit develops blockbuster cash card, Omaha World Hearld Sunrise Edition, Business Section, Jan. 19, 1996, p. 16.
Payment data, www.paymentdata.com, Mar. 5, 2004.
Phil Britt, Competing in Auto Lending, America's Community Banker, vol. 5, No. 11, Nov. 1, 1996, 7 pages.
Proton world and Europay to co-operate in creation of new CEPS-compliant e-purse application, Press Release 1999, Waterloo, Belgium, Jun. 28, 1999, 2 panes.
Purse Application for Cross Border Use in Euro, Cordis, Pace 1st 1999-11531 Pace, www.cordis.lu, printed Feb. 23, 2001, 3 panes.
Ralph E. Spurgin, "Sopininmon! or What's happening in the retail credit card environment", Credit World Journal, Apr. 1997, 7 pages.
Sanchez-Klein, Electronic purse alliance planned, Computerworld Online News, Jul. 29, 1998, printed Feb. 23, 2001, 2 pages.

(56) References Cited

OTHER PUBLICATIONS

Schwab, Charles, Now 7 Ways for a better Total Return for Your Money; Schwat 1, the Inventor's Asset Management Account, Charles R. Schwab, Charles Schwab & Co., Inc., 16 pages.
SIC/MCC Code Definition Retrieved form the Internet at: www.merchantglossary.com/glossary/s/standr-industry-code from Sep. 13, 2009.
SK100 Smart Card Electronic Purse Balance Reader, SK100 Balance Reader, http://perso.wanadoo.fr, printed Feb. 23, 2001, 1 page.
Smart card for loyalty and e-purse applications eclipses capability of conventional mag-stripe cards, Press Release, www.1.sib.com, Apr. 21, 1997, printed Feb. 23, 2001, 3 pages.
Smart Cards: Big Brother's Little Helpers, The Privacy Committee of New South Wales, No. 66, Aug. 1995.
SmartAxis: Load Cash on to your E-Purse Card, Supported Currencies and Schemes, www.smartaxis.co.uk, printed Feb. 23, 2001, 9 pages.
Song, A Card That Asks for ID, Time Magazine, Apr. 12, 2004, 1 page.
Stefani C. O'Conner, Business Travel News, "Maritz gets mastercard's stamp of approval", Aug. 19, 1996, 2 pages.
Stoughton, The Gift of Credit, www.washingtonpost.com/wp-srv/business, Dec. 14, 1998.
Stuber, The electronic purse: An overview of recent development and issues, Bank of Canada, Technical Report No. 74, www.bankofcanada.ca, Jan. 1996, printed Feb. 23, 2001, 2 pages.
Swift Gift 'Wows' Internet Shoppers, PR Newswire, Dec. 2, 1998, 2 pages.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Vandenengel, Cards on the Internet: Advertising on a $3 Bill, Industry Intelligence, Feb. 1, 1995, pp. 46-48.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa first to launch electronic purse load via GSM mobile phone, www.cellular.co.za, Johannesburg, ZA, printed Feb. 23, 2001, 4 pages.
Visa International and SERMEPA Announce Plans for Cross Border Visa Cash Based on CEPS, www.visa.com/av/news/praaamisc111699.vhtml, Nov. 16, 1999.
Visa releases visa cash electronic purse specifications based on CEPS, www.visa.com/av/news/PRaamisc042099.vhtml, San Francisco, Apr. 20, 1999.
Welcome to Card Express Cardlix, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Internet Archives WayBack Machine print outs of the delta.liveonline.net website from Jan. 21, 2001.

\* cited by examiner

SYSTEM AND METHOD FOR GRANTING PROMOTIONAL REWARDS TO CREDIT ACCOUNT HOLDERS

RELATED APPLICATIONS

This patent application is a Continuation of U.S. patent application Ser. No. 10/683,294, filed on Oct. 14, 2003, entitled "SYSTEM AND METHOD FOR GRANTING PROMOTIONAL REWARDS TO CREDIT ACCOUNT HOLDERS," which claims priority to Provisional Application Ser. No. 60/417,658, filed Oct. 11, 2002. The disclosures of these priority applications are hereby incorporated by reference in their entirety.

FIELD OF THE INVENTION

The present invention is generally related to data processing techniques for enabling bank customers to earn promotional rewards. More particularly, the present invention is related to a data processing technique for allowing a Bank's existing credit cardmembers to earn promotional rewards for specific triggering behaviors in a specific time frame, wherein the rewards can be targeted to specific cardmembers or groups.

BACKGROUND OF THE INVENTION

Rewards are given to customers by merchants for various reasons, including to encourage certain consumer behaviors and also to strengthen relationships between Banks and customers. Rewards can also be used to strengthen the relationships between merchants and customers, such as when a Bank offers a merchant-related reward such as a gift card, or when a merchant or affiliated Bank offers a reward for using a particular credit card with the merchant.

There is a recognized need in the financial services industry to attract and retain loyal customers. A loyal customer is one who uses a single Bank for all or a significant number of banking relationships and does so over an extended period of time. This need is particularly important to Banks in small and medium sized communities where regionally and nationally marketed financial services have attracted customers away from local institutions. This need is also important to Banks that compete in small and medium-sized communities to attract customers, and also to Banks that compete in highly competitive markets where customers are offered a wide variety of investment and other banking relationship options, some of which may individually be very enticing to existing customers of other banks.

Thus, incentive reward programs for rewarding customers, particularly repeat or ongoing customers, have become increasingly common in a variety of industries. Well known examples of the use of incentives to attract and reward repeated customer patronage are airline frequent flyer programs. In airline frequent flyer programs the customer is awarded points, often expressed in terms of "miles traveled" for each use of a particular airline or its partners or affiliates. Additional points or "miles" are awarded for use of ancillary services such as car and hotel room rentals. Other examples of customer incentive programs include the trading stamp programs once popular in the grocery retail trade.

The implementation of a customer incentive program for Bank customers has complexities not found in customer incentive plans in other industries. The relationships between the Bank and any customer may be quite numerous and complex, involving a number of different kinds of accounts and interactions. Most other incentive programs require tracking of only one customer factor such as miles traveled in a frequent flyer program or the total dollar volume of purchases in a grocery store trading stamp program.

There can exist a great deal of variation among Banks in the types of financial services offered and emphasized. In particular, different Banks may wish to establish different scoring systems for the various types of consumer-bank relationships and consumer behaviors, depending on which relationships and behaviors are found to be the most profitable by the Bank, Bank partners, and third parties who offer rewards to Bank customers. Further, each Bank may wish to establish a different award structure of incentives, depending upon that Bank's perception of the benefits of the program in relation to the costs of the incentives and the needs of its particular community.

Furthermore, for an incentive program to be fully effective as a tool for attracting and retaining long-term customers, it is desirable for the Bank's management to be able to monitor customer behaviors and the relationships between the Bank and its customers, as individuals and as groups. The Bank may thus be able to identify significant opportunities for marketing its financial services by evaluating customer behaviors and relationships and the appeal of those behaviors and relationships to customers.

To these ends, Banks have developed a wide variety of rewards programs to attract and retain customers. Typically, a reward program of a financial product such as a credit card will allow customers to earn rewards in a predetermined rewards system. There is typically one type of reward, a base reward, and one type of method of earning the reward. For instance, some Banks offer a 1% cash rebate each time a customer uses a platinum credit card issued by the Bank. Other incentive rewards programs may offer a reward in the form of reward currency, such as frequent flyer miles or points, which can be used to purchase other rewards or benefits.

Further, the universe of reward-earning behaviors for such rewards programs is limited. Rewards are typically earned by charging more transactions on a credit card account. Special rewards also may be earned by purchasing from a particular Bank partner ("Partner"). Finally, rewards can be earned by accomplishing certain tasks or exhibiting certain behaviors, such as by opening a bank account. However, prior art reward systems typically cannot differentiate transactions (or other reward-earning behaviors) beyond these limited criteria of dollar amount and merchant.

Thus, prior art rewards programs typically have limited reward-earning behaviors that earn limited rewards. While Banks have successfully encouraged cardmembers to use their credit cards by offering a rewards program associated with the card, Banks typically do not continually provide additional promotional rewards programs targeted to specific customers or groups, wherein rewards are earned through specific triggering behaviors. What is needed is a robust and efficient system of offering a plurality of promotional rewards programs to individual cardmembers or classes of cardmembers, wherein the rewards programs enable customers or customer groups to earn a variety of rewards by accomplishing a variety of behaviors and/or transactions. It is further desirable to have a rewards program system that is customizable across a wide variety of variables.

BRIEF SUMMARY OF THE INVENTION

Generally speaking, the foregoing needs are fulfilled by providing in one exemplary embodiment a system and method for providing promotional rewards. First, a promotional reward is communicated to a customer. The promotional reward offer comprises a promotional reward associated with a promotional reward-earning behavior and a promotional time frame. The offer may specify a customer population, and the customer may be enrolled in the promotional reward program if the customer is determined to be in the population. The customer is credited a promotional reward if the customer accomplishes the promotional reward-earning behavior within the promotional time frame. The customer may also be enrolled in a base reward program, and the promotional rewards may be accumulated in a customer account along with the base rewards.

In another embodiment, a system is provided for implementing a promotional rewards program. An offer setup processor generates offers for one or more promotional rewards programs. Each promotional rewards program enables one or more customers to earn one or more rewards by accomplishing one or more specific reward-earning behaviors during a specific time frame. The one or more customers are also enrolled in a base rewards program. An enrollment processor enrolls customers into one or more promotional rewards programs by processing offer data and customer account data. A qualifying processor processes customer transaction data to determine whether a customer transaction earns a reward pursuant to an offer.

In yet another embodiment, a computer-readable medium encoded with computer program code is provided for implementing a promotional rewards program. A customer is offered promotional reward earnings that can be accumulated in a customer rewards account pursuant to a promotional rewards program. Promotional reward earnings and base reward earnings are accumulated in the customer rewards account. The promotional reward earnings are accumulated pursuant to the promotional reward program, and the base reward earnings are accumulated pursuant to a base reward program.

Other embodiments could be considered.

DETAILED DESCRIPTION OF THE DRAWINGS

Figure 1:
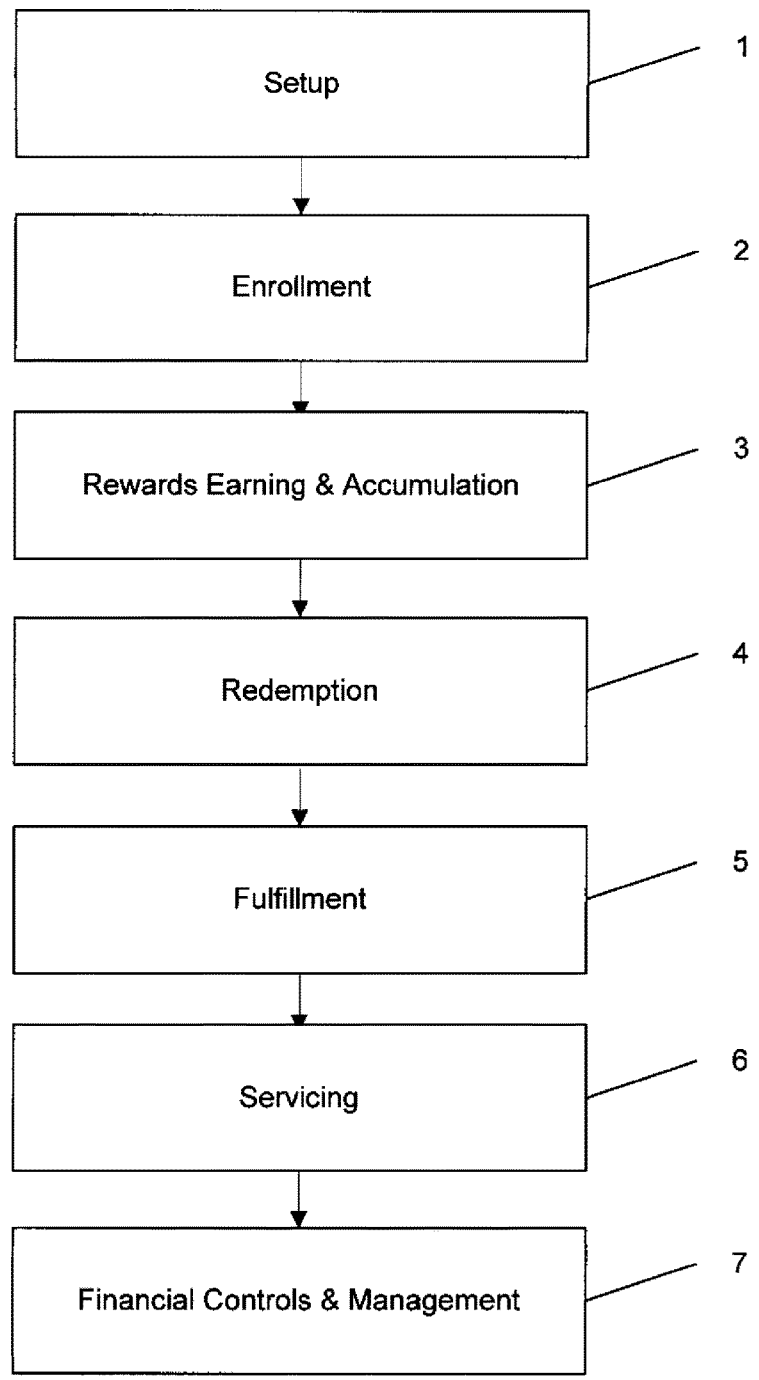
FIG. 1 illustrates the process flow of a typical rewards engine according to the prior art.

FIG. 1 illustrates the process flow of a typical rewards engine according to the prior art. First, a rewards program system is created in step 1. The systems and processing environments at the Bank, the card processor, and the Bank Partners are established for processing the rewards functions. Rules defining the reward program are specified. For instance, it may be specified that all platinum credit cardmembers will receive a 1% cash rebate for all platinum credit card transactions.

In step 2, a cardmember (or cardmember population) is enrolled in the reward program.

In step 3, enrolled customers earn and accumulate rewards according to the rewards program earning rules. To earn and accumulate rewards, the rewards engine receives information relating to customer transactions that earn rewards.

In step 4, an earned reward is redeemed, and the reward is removed from the customer's account.

In step 5, the reward is fulfilled, and the customer actually obtains the reward. In the case of a rebate check, fulfillment occurs when the check is actually printed and mailed, or otherwise delivered or transferred to the customer.

In step 6, the customer reward and/or account is serviced. This may comprise any actions taken with regard to customer service or otherwise ensuring that the customer appropriately received the reward, or otherwise ensuring that any of the prior steps took place properly. For instance, a reward may be serviced when a customer calls to complain that the reward was never received, or that an inappropriate amount was debited from a reward account.

In step 7, the Bank may audit or otherwise monitor the rewards program.

It should be noted that in the prior art method of FIG. 1, a customer account is enrolled in only one rewards program at a time.

Figure 2:
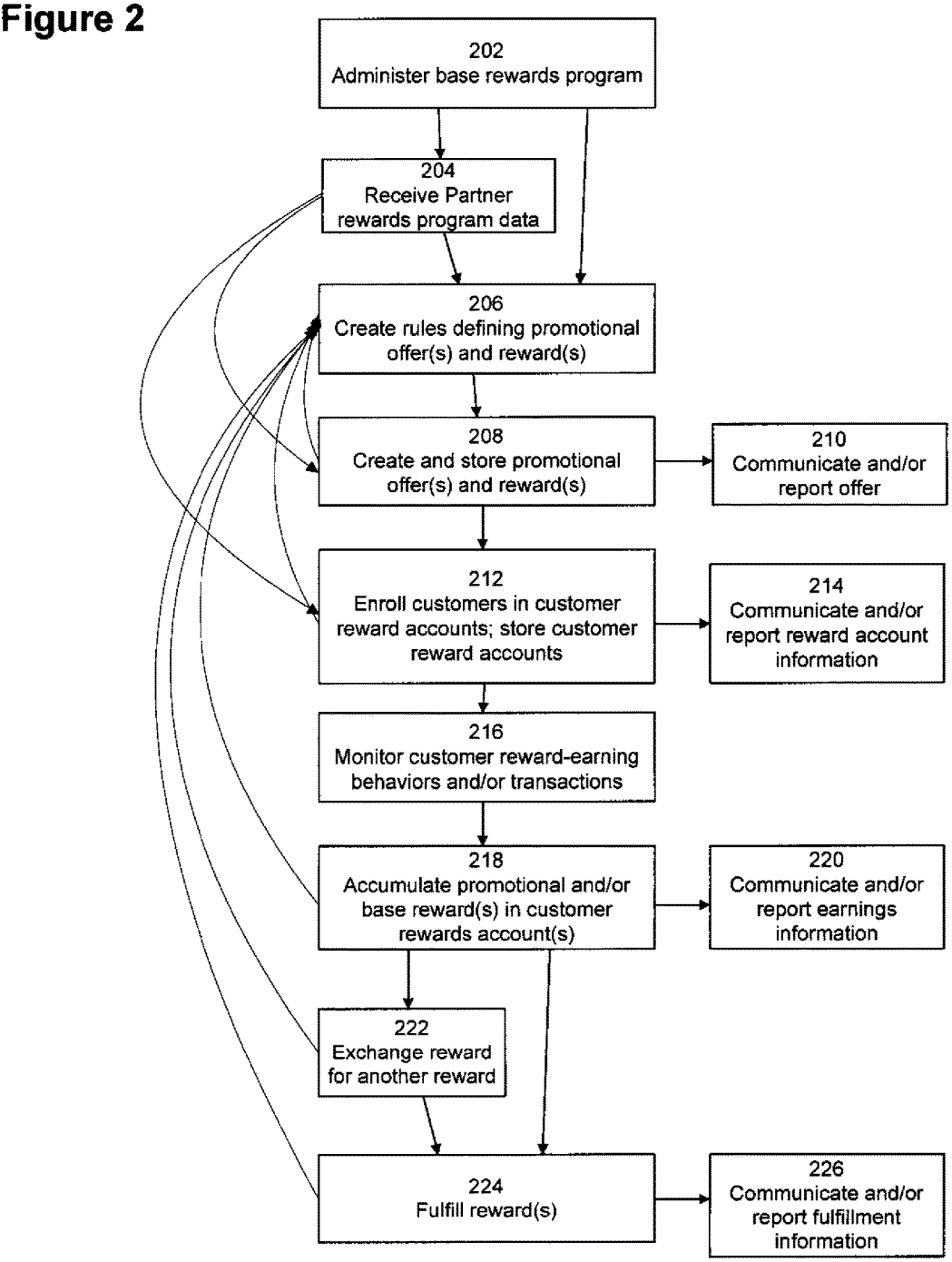
FIG. 2 shows a flow chart of a promotional rewards engine according to an embodiment of the present invention.

FIG. 2 shows a flow chart of a promotional rewards engine according to an embodiment of the present invention.

The assignee of the present invention has developed a Bank customer incentive program called the "Promotional Rewards Engine" that greatly improves upon the prior art. The Promotional Rewards Engine ("PRE") is a system that processes promotional rewards offers to existing credit cardmember populations. The PRE allows a Bank (and/or the marketing department of a Bank) to offer one or more additional rewards earning opportunities to credit cardmembers.

Through the PRE, a Bank offers rewards programs to existing Bank customers so that the customers may earn rewards by performing specific behaviors during a specified time frame. As used herein the term "Bank" is intended to mean all types of financial service institutions, including banks, savings and loan associations, credit unions, credit card issuers, and the like, which offer a variety of financial and investment services to customers, such as credit cards; "triggering behaviors" refers to credit card purchases, other account activity, and other consumer behaviors that can trigger the earning of rewards in a rewards program; and the term "reward" is intended to mean some type of consideration or recognition established and given by the Bank, the Bank's partners, or third parties to the customer in recognition of the customer's specific behaviors in the specific time frame, such as gifts, cash rebates, and frequent flyer miles.

A portion or all of the Bank's customers may be enrolled or participating in any given program, depending on the eligibility rules of the program. A rewards database stores customer-specific reward information for each customer enrolled in the Promotional Rewards Program. Rewards such as rewards currency are automatically calculated based on the triggering behaviors performed by the customer, and earned rewards are awarded either upon demand of the customer, or automatically on an immediate or periodic basis. The point awards may be increased depending on the rules defining the reward program.

The PRE may interface with a Bank Partners' loyalty and rewards systems. For example, the PRE has the capability to offer and process rewards through a Bank Partner's rewards system, and/or to offer and process a Bank Partner's rewards program through the PRE system.

The PRE system may be used for any customer or group of customers that have an account with or associated with a Bank. Such accounts may or may not be associated with physical cards, such as plastic credit cards with a magnetic stripe. Accounts may comprise smart card accounts, accounts associated with a radio frequency identification device such as Speedpass™ and EZ Pass™, accounts associated with cardless payments (wherein a cardless account with a user name and alias is associated with another cardmember account), virtual accounts (such as one-time use accounts set up for a special purpose), or other transaction accounts. Such non-traditional accounts may have non-traditional "cards" or other identifiers associated with them. For purposes of the invention, such identifiers are considered cards associated with the account.

In step 202 of FIG. 2, the Bank administers a base rewards program. Alternately, the base rewards program could be administered by another entity, such as a Bank Partner or third party. The base rewards program may be implemented by a Promotional Rewards Engine (PRE), as referenced above. Customers are enrolled in a rewards program associated with a customer account. Customers may choose from among a variety of rewards programs for a particular customer account. The rewards program is associated with one or more earning behaviors (such as transactions) and one or more rewards which can be earned through those behaviors.

In optional step 204, the PRE receives Partner rewards program data. The PRE is configured to manage the Bank rewards program as well as the rewards program of Bank Partners who do not manage their own customer rewards earnings and fulfillment processes. Thus, step 204 occurs when the PRE is managing one or more Bank Partner rewards programs. The PRE then handles the management of the Partner rewards program in accordance with the rules governing the Partner rewards program. Depending on the arrangement with the Partner, the method may then proceed to steps 206, 208, and/or 212.

In step 206, the Bank creates its promotional rewards program, including the rules defining the program. The rules may be any of the rules described herein, including rules governing the offer, reward, and eligible population.

In step 208, the PRE creates and stores the offers and rewards. These offers and rewards may be created by the Bank Interface 76 and Create Bank Offer & Partner Offer Modules 40, 42 of FIGS. 3A & 3B, as described below. The offers and rewards information may be stored in the Offer Database 20 of FIGS. 3A & 3B.

In optional step 210, the PRE communicates the offers and rewards to the customers. It may also report the offer and reward information for internal or external auditing purposes. For instance, it may report the information to an internal data collection module such as the Report Module 70 and/or Bank Interface 76 of FIG. 3B. The customers may comprise Bank customers having accounts with the Bank. The customers may also comprise Partner customers, if the PRE has received Partner rewards program information in step 204. Communication with the customer can occur via any means described in FIGS. 3A and 3B.

In step 212, the PRE enrolls customers in customer reward accounts. The accounts are created and stored, preferably in a database. Each reward account may be associated with an existing customer account. More than one reward account may be associated with a single customer account. Each reward account may be associated with one or more rewards.

In step 214, the PRE may communicate reward account information to the customer. It may also report the reward account information for internal or external auditing purposes. For instance, it may report the information to an internal data collection module such as the Report Module 70 and/or Bank Interface 76 of FIG. 3B. Such account information may comprise a description of the reward program, the number of the account, and the balance of the reward account. For new accounts, the balance may be zero. There may be a positive balance if the customer is automatically given an initial reward upon enrollment in the rewards program. For instance, a customer who signs up for a checking account may automatically receive a free $5 gift certificate to a Partner retailer, in which case the reward account created for that customer would have a positive balance. The reward account balance may also be positive if it is not a new account, but rather if it is converted from another reward account or portfolio. If the old account had a positive balance, then the new, converted account would carry over a balance. In these cases, the reward balance may need to be converted. For instance, if the prior balance was a number of merchant points, but the converted account offers only frequent flyer miles, then the points may be converted into miles.

In step 216, the PRE monitors customer transactions and behaviors in order to determine reward earnings. As defined by the reward program, specific transactions and/or behaviors may earn rewards.

In step 218, the PRE accumulates earnings to the customer reward account based on the customer's reward earning transactions and behaviors monitored in step 216.

In optional step 220, the PRE communicates the reward earnings to the customer. It may also report the earnings information for internal or external auditing purposes. For instance, it may report the information to an internal data collection module such as the Report Module 70 and/or Bank Interface 76 of FIG. 3B.

In optional step 222, the PRE may exchange one or more customer rewards for one or more other rewards. This may be at the request of a customer, for example if the customer wants to switch reward programs or reward types.

In step 224, the rewards are fulfilled. A reward may be delivered to a customer, credited to a customer account, provided to a Partner or third party who will provide the reward to the customer, or otherwise provided to the customer.

In optional step 226, the PRE communicates the fulfillment of the reward. The PRE may also debit the reward from the customer's reward account. It may also report fulfillment information for internal or external auditing purposes. For instance, it may report the information to an internal data collection module such as the Report Module 70 and/or Bank Interface 76 of FIG. 3B.

Figure 3A:
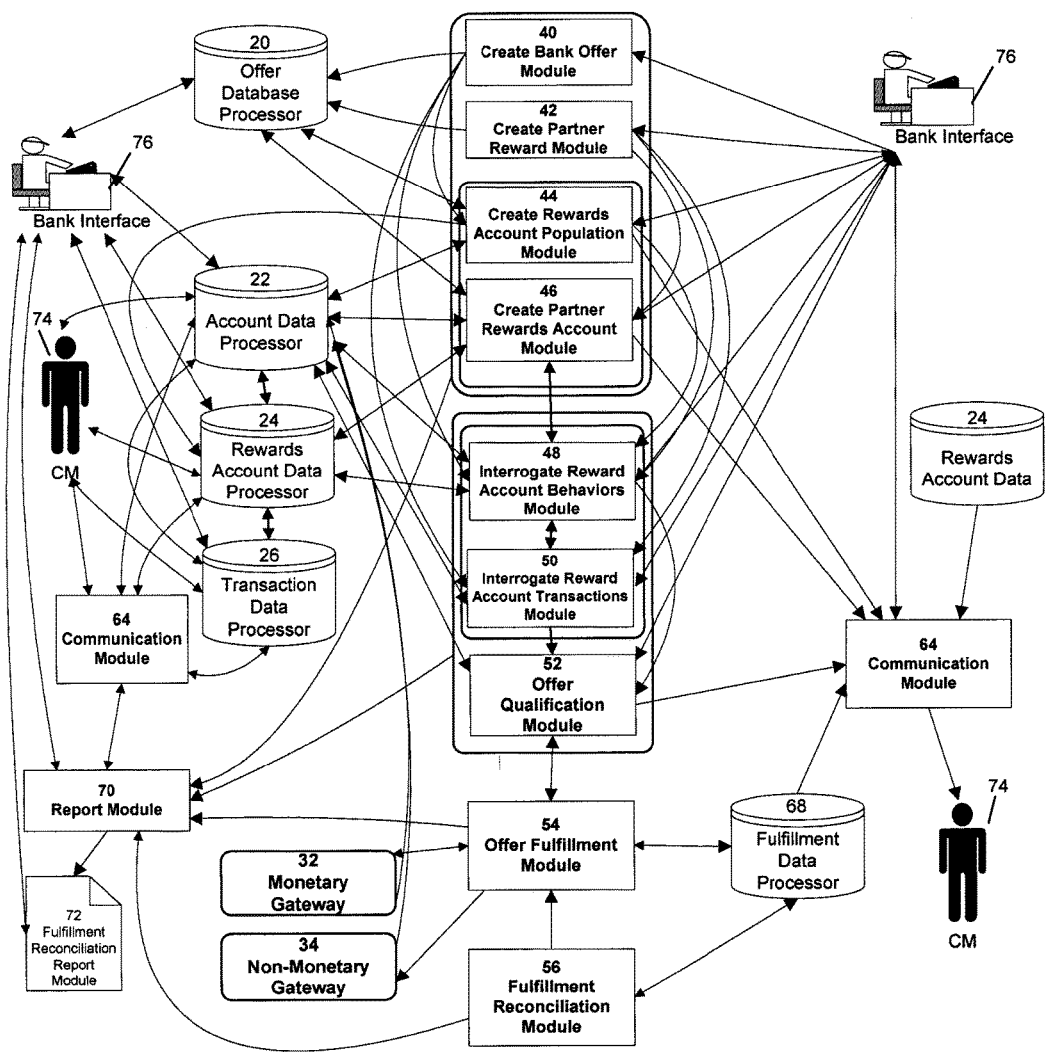
FIG. 3A illustrates a promotional rewards engine system according to an embodiment of the present invention.
Figure 3B:
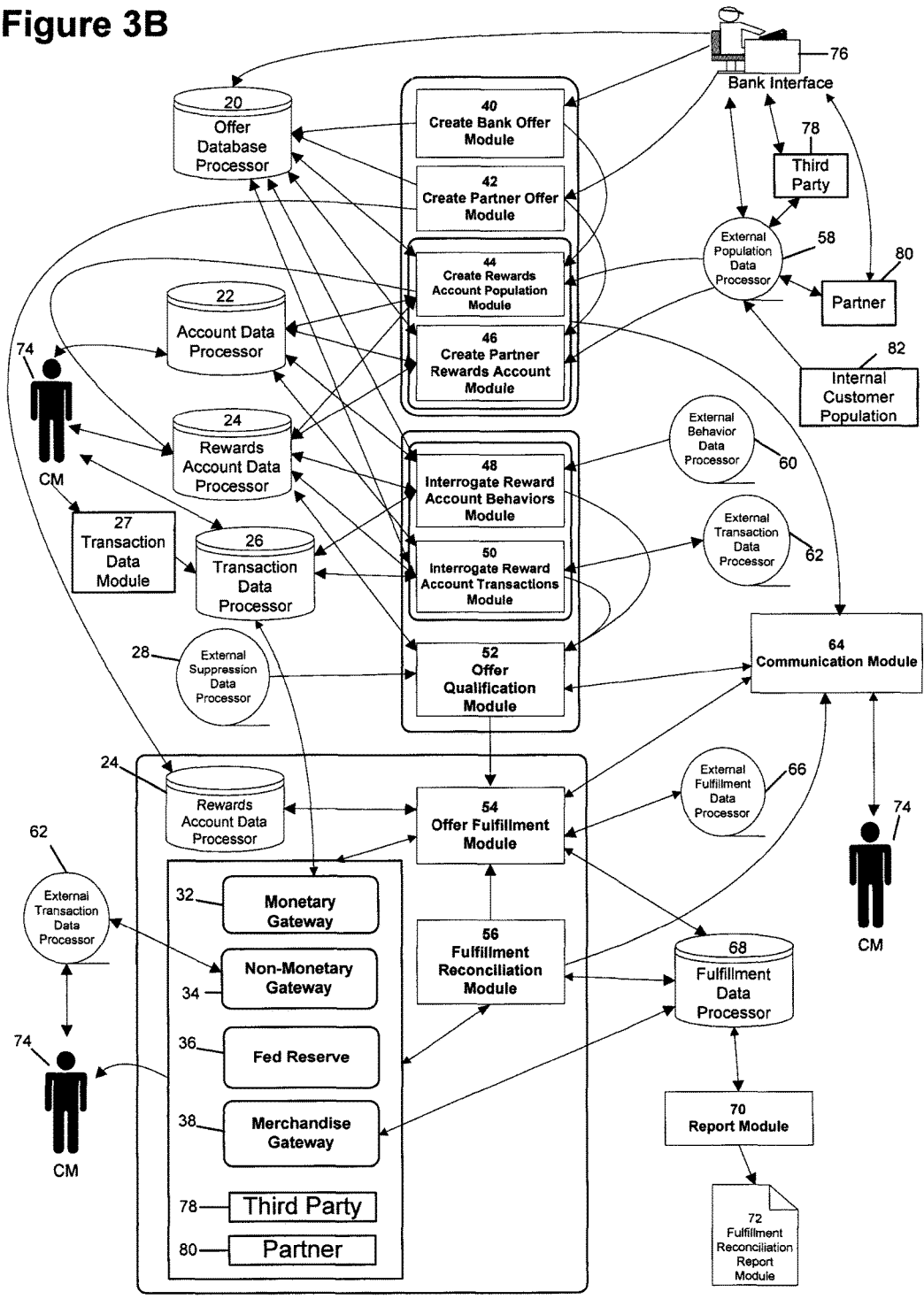
FIG. 3B illustrates additional features of the promotional rewards engine system of FIG. 3A.

The method described above in FIG. 2 may also include features of the PRE as described in FIGS. 3A and 3B. For instance, the communicating and/or reporting steps 210, 214, 220, 226 of FIG. 2 may be accomplished by the Communication Module 64 and/or the Reporting Module 70 via any of the communication methods described for those Modules 64, 70, or any other communication means described herein. The rules defining the offers in step 206 may comprise any offer rules as described herein, such as with respect to the Bank Interface 76, the Create Bank Offer Module 40, and the Create Partner Offer Module 42. The steps of monitoring transactions and behaviors 216 and accumulating rewards 218 may comprise the operations described with respect to the Interrogate Reward Account Behaviors and Transactions Modules 48, 50 and the Offer Qualification Module 52, and other associated modules, as described below for FIGS. 3A & 3B.

FIGS. 3A and 3B show the Promotional Rewards Engine (PRE) according to one embodiment of the invention.

As shown in FIG. 3A, the Bank Interface 76 may pass rules and other information to the Create Bank Offer Module 40, the Create Partner Offer Module 42, the Offer Database 20, the Create Rewards Account Population Module 44, the Create Partner Rewards Account Population Module 46, the Interrogate Reward Account Behaviors Module 48, the Interrogate Reward Account Transactions Module 50, the Offer Qualification Module 52, the Offer Fulfillment Module 54, the Fulfillment Reconciliation Module 56, the Communication Module 64, and the Report Module 70. The Bank Interface 76 may generate these rules and information or receive them from the Bank. The rules may govern and/or define the Bank's and/or Bank Partners' rewards program(s) by governing and/or defining the operation of the Modules 40, 42, 44, 46, 48, 50, 52, 54, 56, 64, 70 and Offer Database 20. The various rules are described further in conjunction with FIG. 3B.

FIG. 3B shows the PRE of FIG. 3A in greater detail. In the PRE system, any of the Processors 20, 22, 24, 26, 28, 58, 60, 62, 66 & 68 and Modules 40, 42, 44, 46, 48, 50, 52, 54, 56, 64, & 70 may comprise a processor, database, and suitable inputs and outputs for communicating with other processors. For instance, a processor or module may comprise a computer, a computer program, a server, or other appropriate data processing device. Some of the PRE system components may share the same hardware. For example, one computer may be one or more elements of the PRE.

Still referring to FIG. 3B, the Bank Interface 76 may pass rules or other information to the Modules as described above. A rule may comprise any instruction, parameter, macro, subroutine, program, or any other instruction set that may apply to one or more customers or population groups, one or more rewards or reward programs, any other feature as described below, or any other feature defining a Bank or Partner reward program. For instance, the rules may change the accumulation rules of a rewards program used by the Interrogate Reward Account Behaviors and Transactions Modules 48, 50 to accumulate customer rewards.

The Bank Interface 76 may change (or provide rules which change) relationships between the Bank and its Partners, between a customer and any rewards programs associated with the customer, or between the customer and the Bank. For instance, the Bank Interface 76 may change the rules defining a reward offered by a Bank or Partner rewards program to a customer or customer population. The Bank Interface 76 may specify the rules governing reward program participation, program transfer, currency conversion, and redemption for specific customers, customer groups, and programs. The Bank Interface 76 may set up rewards currency earning and accumulation algorithms based on defined business rules. The Bank Interface 76 may also setup rules governing the redemption and fulfillment of goods, services, and payments to be provided to customers as rewards.

The Bank Interface 76 may comprise (or be implemented by) a sub-entity of an issuing Bank, such as the marketing department of the Bank. The Bank Interface may also comprise multiple banks, multiple Bank Partners, or any combination thereof. For instance, the Bank Interface of the PRE may comprise a module that receives reward program information from other banks and Partners. In this way, the PRE may manage the rewards programs of those other banks and Partners.

The Bank Interface 76 may quickly add new items to rewards catalogs (redemption sets). This is partly because the Bank Interface 76 may provide Bank representatives the ability to view and edit the rules defining and governing any of the Modules, including the Bank Interface 76. Such authorized representatives may edit and view the Modules via Bank computer terminals, over the Internet, or via other channels.

The Bank Interface 76 may quickly incorporate new information from other modules and databases to reflect program changes and new offers across servicing channels.

One advantage of having a separate Bank Interface 76 is that it may be configured to quickly add a new earning algorithm if the new algorithm is to be driven from data already driving other rewards currency earning algorithms. For instance, the Bank Interface's 76 algorithm exists separately and can therefore be modified separately from the data it acts upon. Thus, adding to, subtracting from, or otherwise modifying the Modules 40, 42, 44, 46, 48, 50, 52, 54, 56, 64, and 70 minimizes time, cost, and administrative inefficiency.

The Create Bank Offer Module 40 and Create Partner Offer Module 42 apply the rules received from the Bank Interface 76 and thereby enable various functions and capabilities related to the setup of the PRE and associated rewards programs. These two Modules 40, 42 may operate separately: the Create Bank Offer Module 40 receives and applies rules and other information related to rewards programs that are created by the Bank itself, whereas the Create Partner Offer Module 42 receives and applies rules and other information related to rewards programs that are created by Bank Partners. For instance, the Create Bank Offer Module 40 may receive rules related to an offer whereby customers in Alabama earn 1% cash back for all purchases in July that are over $50. The Create Partner Offer Module 42 may receive rules related to an offer whereby a Partner airline offers double frequent flyer points during the month of February for all Partner purchases.

The Create Offer Module 40 and Create Partner Offer Module 42 may set up a program as a set of accumulations rules and redemption options. The Modules 40, 42 may also define sets of one or more redemption items (redemption sets or collections) and add or delete items from any redemption set. For example, the redemption items may comprise single item sets like Partner airline miles and premiums. Redemption sets may also comprise merchandise collections, sets of cash equivalents (checks and gift certificates), Partner airline miles, pre-defined travel packages, and Partner merchant coupons.

The Modules 40, 42 may add or delete any redemption item or redemption set to or from any reward program and control the capabilities and allowable combinations of the redemption through business rules. For example, the Bank Interface 76 may add a cash rebate option to multiple rewards programs or offer travel options to premium rewards accounts, or it may offer the redemption of airline Partner miles to customers who already have a different option.

The Modules 40, 42 may define sets of rules for earning rewards currency and/or rewards under a program's earnings and accumulation requirements. The Modules 40, 42 may also specify attributes or characteristics that limit or define the events, transactions, and behaviors ("triggering events") for which a customer earns a reward or rewards currency. Those attributes may comprise transaction date, time, location, frequency, amount, and other triggering attributes.

The specific triggering events are defined according to the specific offer, i.e., the rules defining the offer provided by the Bank Interface 76. An offer may be classified according to: offer type or subtype; offer delivery channel (i.e., how the offer is communicated to the customer, which may comprise any means of communicating with the customer described herein); offer response channel; start time; end time; offer campaign; internally or externally provided population or population criteria; transaction type; frequency of a specific type of transaction; frequency of total transactions; amount of one or more transactions; minimum transaction amount for triggering earning a reward; maximum transaction amount for earning a reward; earning cap; variable or fixed reward amount; reward amount (or conversion factor, if based on a transaction amount); reward identifier; redemption type (automatic, on-demand, or at a certain date); customer account status (such as closed, frozen, bankrupt, revoked, or otherwise in bad standing); merchant description of the transaction; number of operative time periods; number of tiers (if the offer is a tiered offer); and Partner. For instance, the Create Bank Offer Module 40 may define a rule enabling customers to earn rewards based on the size of their home equity line of credit or credit card balance in one or more rewards programs. The Create Partner Offer Module 42 may specify one or more Partner rewards that will be earned upon one or more triggering events.

The Modules 40, 42 may create additional rules and information based on the rules and information received from the Bank Interface 76. The additional rules and information may comprise rules defining an offer and reward of a reward program. The Modules 40, 42 may pass their created rules and information to the Offer Database Processor 20. As noted above for all Modules, the Offer Database Processor 20 may alternately receive these rules and information directly from the Bank Interface 76.

The Create Offer Module 40 may generate Bank rewards, offers, rules, and other information. It is configured to pass this information to the Create Rewards Account Population Module 44. Similarly, the Create Partner Offer Module 42 may generate Partner rewards, offers, rules, and other information. It is configured to pass this information to the Create Partner Rewards Account Population Module 46.

The Create Rewards Account Population Module 44 may also receive rules and information from the Offer Database Processor 20. For instance, the Create Reward Account Population Module 44 may receive rules or other information defining the population eligible to participate in a particular rewards program. Similarly, the Create Partner Rewards Account Population Module 46 may also receive rules and information from the Offer Database Processor 20. For example, the Create Partner Rewards Account Population Module 46 may receive rules or other information defining the population eligible to participate in a particular Partner rewards program.

The Create Rewards Account Population Module 44 and the Create Partner Rewards Account Population Module 46 receive rules defining a population eligible for a Bank or Partner reward program, respectively. For instance, in the Alabama 1% rebate example described above, the Create Rewards Account Population Module 44 may receive a rule specifying that the eligible population is all Bank cardmembers who live in Alabama. A Partner airline may offer double frequent flyer miles during the month of February to anyone who has a Partner account, in which case the Create Partner Rewards Account Population Module 46 may receive a rule defining that the eligible population is everyone who has a Partner account.

The Modules 44, 46 are configured to receive population information from a variety of sources, including the Bank Interface 76 and the External Population Data Processor 58. The External Population Data Processor 58 collects population data information from the Bank Interface 76, third parties 78, and Partners 80. It passes the population data to the Modules 44, 46.

The Modules 44, 46 may also receive population information from the Account Data Processor 22, which stores customer account information including population information such as customer addresses. The Create Rewards Account Population Module 44 and the Create Partner Rewards Account Population Module 46 may also receive population information from the Create Bank Offer Module 40 and the Create Partner Offer Module 42, respectively.

Based on received population rules and population information (such as customer account information stored in the Account Data Processor 22), the Create Rewards Account Population Module 44 and the Create Partner Rewards Account Population Module 46 generate the populations eligible to participate in Bank and Partner rewards programs, respectively. For instance, an offer may define a population as all customers in Alabama, and the Create Rewards Account Population Module 44 and Create Partner Rewards Account Population Module 46 may generate the population of Alabama customers based on customer address data stored in the Account Data Processor 22 for each customer.

The Account Data Processor 22 stores and processes information related to customer accounts. Information stored by the Account Data Processor 22 may comprise personal information about each customer and financial information related to the customer's account. Personal information for a particular cardmember may comprise the cardmember's name, address, social security number, hair color, height, weight, age, product preferences, credit rating, personal information of other authorized users of the account, mother's maiden name, and/or any other personal information. Financial information related to a customer's account may comprise the cardmember's account numbers with the bank, account numbers and other account information of a customer account with a Partner, activity on each account, and any other financial information. Account activity may comprise date, time, location, and amount information for each transaction; transaction type; account payment histories; and any other information account information for a customer 74. Account activity information is stored at the Account Data Processor 22 after it is received from the Transaction Data Processor 26, which receives such transaction information from the Transaction Data Module 27, which receives and stores customer transaction information. Any of the data stored in the Account Data Processor 22 may be used to determine whether customer behaviors earn rewards (i.e., whether a customer behavior is a triggering event). The data may also be used to determine whether a customer is a member of a population.

The Account Data Processor 22 may provide rules-based access to specific functions and information of the Processor 22. For example, the Processor 22 may only allow primary account holder customers 74 to redeem a reward, or it may allow only the controlling account for a small business to redeem or change options of its enrolled programs. Other modules and databases such as the Offer Database Processor 20 may also provide rules-based access to their specific functions and information. For instance, it may not allow the Interrogate Reward Account Transactions Module 50 the ability to overwrite an offer file stored at the Offer Database 20.

The Communication Module 64 may receive customer account information or other information from the Create Bank Offer Module 40, Create Partner Offer Module 42, Create Rewards Account Population Module 44, Create Partner Rewards Account Population Module 46, Interrogate Reward Account Behaviors and Transactions Modules 48, 50, Offer Qualification Module 52, Offer Fulfillment Module 54 56, and Bank Interface 76. For instance, the Communication Module 64 may receive names and/or logos of any enrolled rewards programs, rewards/points/currency summaries of those programs, a status report regarding earnings on a customer reward account, or any other information associated with the programs from the Offer Qualification Module 52.

The Communication Module 64 may communicate information to the customer via the Internet, an account statement, proactive services, a voice response unit, a customer representative (via phone or email), a welcome kit, acquisition offers, inbound telemarketing, outbound telemarketing, direct mail, or any other communication means described herein.

The Communication Module 64 may customize the customer's statements to include any customer account or reward account transaction, such as transaction history, reward earnings balance, reward earnings history, available reward programs or offers, rewards (such as earned coupons or rebate checks), or other information. For instance, the Communication Module 64 may communicate to a customer what the customer must do to earn a particular reward (such as the difference between the customer's current transaction volume for a given month and the transaction volume threshold necessary to earn a particular reward), and/or the additional behaviors that must be accomplished after that to earn a second reward (such as for a phased reward, described below). The customer statements may be on paper (via U.S. mail, for example). They also may be available on a webpage or via any other communication means described herein. The Communication Module 64 may then integrate such information into account statements sent to the customer, or it may otherwise make such information available to the customer. The Communication Module 64 may send the customer the statement or enable the customer to access the statement over a variety of channels, such as a Bank website over the Internet, which may be password-protected. Other channels may comprise email, a customer service telephone number, a voice recognition unit, a bank teller, an ATM, a merchant point-of-sale ("POS") system, a signature debit payment system, and a PIN debit system. The customer may also communicate with the Bank via cell phone or PDA.

The Communication Module 64 provides for various capabilities and functions related to servicing the cardmember. For instance, the Module 64 can communicate to the customer 74 the number, amount, or nature of earned, redeemed, or fulfilled rewards.

The Communication Module 64 may provide information (or make information available) to customers, advisors, and/or Bank representatives (such as a servicing department) to disclose the rules for any currency conversion or any other rule.

The Communication Module 64 provides for various capabilities and functions related to communicating with a customer 74. The Communication Module 64 also generally provides for various capabilities and functions related to offers and communication channels between and among the bank, bank affiliates, third parties, modules, databases, and customers 74.

Through the Communication Module 64, customers may access their accounts and/or redeem currency online or through other self-serve channels. Customer 74 may also change their redemption method online (or via another communication channel). For example, a customer 74 might change a redemption from automatic to on-demand. In automatic redemption, a reward may be automatically removed from a customer account without any action by the customer. For a cash rebate, the rebate credited to the account may be deducted when a rebate check is mailed to the customer in a monthly statement letter. In on-demand redemption, earnings are deducted from the customer's account when requested by the cardholder. For instance, the rebates may accumulate in the customer's account until the customer requests a rebate check.

The rewards engine may verify the availability of rewards for fulfillment before deducting the reward earnings from the reward account. For instance, the rewards engine may need to verify that a gift is available in inventory before the reward can be fulfilled and delivered. This may occur when the Offer Fulfillment Module 54 receives reward availability information from the Fulfillment Data Processor 68.

Customers 74 may opt in to various offered rewards programs through the Communication Module 64. Offered rewards programs may be communicated to the customer 74 via the Communication Module 64. For instance, the Communication Module 64 may offer rewards promotions through product statements, rewards statements, and other communication delivery channels.

The Communication Module 64 may provide detail of earnings by specific qualification set or show currency earned for a specified type of event, transaction, or behavior that was set up with different qualifying attributes and calculation methods. For example, the Communication Module 64 may show Partner purchase points, non-Partner purchases, or event-based rewards.

The Communication Module 64 may produce periodic summaries of earnings, balances, and redemption activity that can be separate from or part of product account statements. For example, the Communication Module 64 may produce a free-standing rewards statement.

The Communication Module 64 may access a customer's reward activity summary through different channels. For example, it may be accessed through paper statement or online inquiry.

The Communication Module 64 may communicate to a customer via a Partner's or merchant's desired method. For instance, a desired method might be a Partner privileged mileage account Statement or a Partner Internet portal's personalized site.

An advantage of the present invention is that new rewards accumulation methods can be quickly and easily integrated into these Customer 74 communication channels without specialized knowledge of the PRE system. For example, a new reward program may be displayed on a credit card statement, a demand deposit account (e.g., checking account) statement, or any other statement received by the customer. The customer could also download such information over a computer, cell phone, or personal digital assistant (PDA).

The customer 74 may interface with the Account Data Processor 22, the Rewards Account Data Processor 24, and/or the Transaction Data Processor 26. The Account Data Processor 22, Rewards Account Data Processor 24, and Transaction data Processor 26 are preferably all part of a Bank computer network. Preferably these Processors 22, 24, 26 communicate with one another, for instance, to update account information stored at the Account Data Processor 22 based on new transaction data received at the Transaction Data Processor 26.

The customer may interface with the Account Data Processor 22 via Internet, ATM, phone call, or any other method of communicating with a Bank. The customer 74 may customize an individual account by inputting customization information at the Account Data Processor 22 and/or Rewards Account Data Processor 24. For instance, the customer may change personal information stored on the account such as the customer's address, or the customer may add another authorized user to a customer account. Multiple customers' accounts, such as all the accounts in a family or business group, could be pooled for a particular reward or multiple rewards. For instance, in a pooled account, earnings from multiple customers could be accrued together toward a particular reward. Alternately, the customer 74 may input such information at an access channel that transfers such information to the Account Data Processor 22, Rewards Account Data Processor 24, or Transaction Data Processor 26. An access channel may comprise a Bank customer service department, a Bank, a Bank website or other Internet website affiliated with the Bank, an ATM machine, or another communication channel.

The Account Data Module 22 may receive initial account setup data at the time the customer is applying for the account. For instance, the Account Data Module 22 may receive the customer's name and other account-related information, and the Account Data Module 22 may assign the customer an account number. The Account Data Module 22 may also associate one or more rewards programs with the customer, e.g., when the Create Rewards Account & Partner Rewards Account Population Modules 44, 46 determine that a particular customer qualifies for a particular offer.

The Offer Database Processor 20 receives offer and reward instructions and information from the Bank Interface 76, the Create Bank Offer Module 40, and the Create Partner Offer Module 42. The Offer Database Processor 20 stores this offer and reward information. Preferably, the Offer Database Processor 20 stores each offer. The Offer Database Processor 20 may allow, disallow, or require participation in a specific reward program depending upon other Partner or brand affiliations associated with the account. For instance, if a customer has an account enrolled in a frequent flyer reward program with one airline, the Offer Database Processor 20 may prevent the account from enrolling in a similar program with another airline.

The Create Rewards Account Population Module 44 and Create Partner Rewards Account Population Module 46 request and receive information regarding offers, rewards programs, and rewards from the Offer Database Processor 20 (or directly from Bank Interface 76). For instance, the Modules 44, 46 may receive information regarding an offer wherein all Bank or Partner platinum credit card account holders may earn double frequent flyer miles for all purchases in February. The Modules 44, 46 receive customer account information from the Account Data Processor 22. For instance, the Modules 44, 46 may receive the account numbers of all customers who have Bank platinum credit card accounts. The External Population Data Processor 58 communicates with the Bank Partners 80 and third parties 78 to receive external population data, which it passes to the Modules 44, 46. External population data may comprise information regarding accounts with Partners. The Modules 44, 46 may also receive specific rules or instructions from the Bank Interface 76. For instance, during the month of February, the Modules 44, 46 may receive instructions that any Bank or Partner platinum credit card accounts already associated with a non-Partner airline must be disqualified from the offer.

In a preferred embodiment, the Modules 44, 46 receive rules defining a population eligible for a Bank or Partner reward program, respectively. For instance, in the Alabama 1% rebate program described above, the Create Rewards Account Population Module 44 may receive a rule specifying that the eligible population is all cardmembers who live in Alabama.

The Create Rewards Account Population Module 44 and Create Partner Rewards Account Population Module 46 process population information and creates populations for the rewards programs. A population may comprise one or more customers who, based on the rules and criteria defining a particular offer, qualify for a particular rewards program associated with the offer. For instance, the population may comprise the set of all Bank platinum credit card account holders whose accounts are not associated with a non-Partner airline. The Modules 44, 46 may also enroll such populations in the rewards program. The Modules 44, 46 process this information and create an account for each individual customer who qualifies for a particular rewards program offer. When the Modules 44, 46 enroll a customer in a rewards program, they may pass such enrollment information to the Communication Module 64, which may communicate such enrollment to the customer 74.

The Modules 44, 46 may create an account for each qualifying customer (such as each customer determined to be in the population) and pass this information to the Account Data Processor 22 and Rewards Account Data Processor 24. For instance, if the population comprises all customers who live in Alabama, the Create Rewards Account Population Module 44 may create a rewards account for each cardmember who lives in Alabama. The rewards account would be passed to and stored in the Rewards Account Data Processor 24.

The Rewards Account Data Processor 24 stores information regarding each customer rewards account. For instance, the Processor 24 stores the customer name and account number(s), the rewards account name(s) and number(s) associated with each customer account (there may be more than one rewards account associated with a particular customer account), the accumulation rules of the rewards account, the type of rewards, reward balance, fulfillment information, reward history, and any other reward- or reward account-related information.

Different rewards programs have different enrollment systems and methods. For some rewards programs, cardmembers have the opportunity to enroll in the program at any time after the account is established. To accomplish this, customers may express a desire to enroll in the program by interfacing with the Account Data Processor 22, the Rewards Account Data Processor 24, and/or the Transaction Data Processor 26. Customers may input appropriate information at one or more of the Processors 22, 24, 26 in any method as described herein, such as via a customer service phone number or the Internet. The Processor 22 may pass this information to the Modules 44, 46 on a regular basis, such as immediately or at the close of business every day. Then the Modules 44, 46 may continue to enroll such qualifying customers as they input their preference to enroll at the Processor 22.

This ability to enroll can be limited according to the customer, customer group, and program based on configurable rules. The Modules 44, 46 may receive these rules in any method described above. For instance, as described above, the Modules 44, 46 may receive instructions to limit an offer to customers who hold a platinum account.

Via any communication channels described above, customers may be offered the option to enroll in a reward program at the time of applying for a particular Bank or Partner account. For instance, a customer may apply for an account at the Account Data Processor 22, and the Processor 22 may immediately offer the customer to enroll in any account for which the customer qualifies but has not yet entered. There may be special offers tailored only to customers opening new accounts. Customers may also be capable of opting out of a particular program by entering such preference at the Account Data Processor 22, and during the opt-out process they may be offered another rewards program. The Account Data Processor 22 may be configured to automatically offer the customer another rewards program for which the customer qualifies but has not yet been enrolled.

The Create Rewards Account Population Module 44, the Create Partner Rewards Account Population Module 46, the Account Data Processor 22, and the Rewards Account Data Processor 24 may transfer a customer's or customer group's participation in one program (or multiple programs) to participation in another program (or programs). Alternately, the Modules 44, 46 and Processors 22, 24 may enable the customer or customer group to choose to transfer.

The Create Rewards Account Population Module 44, the Create Partner Rewards Account Population Module 46, the Account Data Processor 22, and the Rewards Account Data Processor 24 may establish currency conversion rules for the switch or transfer, so that rewards or points accumulated in one or more programs can be converted to the different rewards or points offered in the other program(s). To facilitate conversion, a universal unit may be used to measure each reward, such as a dollar value, so that dissimilar rewards can be easily converted into each other. The Create Rewards Account Population Module 44, the Create Partner Rewards Account Population Module 46, the Account Data Processor 22, and the Rewards Account Data Processor 24 may specify allowable program transfer pairs. For instance, the program may allow frequent flyer miles from an airline to be converted to cash rebates or rental car discounts, but it may disallow the conversion of one airline's frequent flyer miles to another airline's frequent flyer miles, or vice versa.

The PRE may allow for terminating a program and de-enrolling one or more customers from a program. For instance, the Bank Interface 76, the Account Data Processor 22, and Modules 44, 46 may terminate a program and de-enroll one or more customers according to rules received. They may also specify the disposition of any accumulated rewards or currency. Accumulated currency may be converted into a reward or currency in another reward program as described below, or it may be lost upon de-enrollment. The Bank Interface 76 may also directly terminate a program or de-enroll customers by inputting information at the Account Data Processor 22.

The Create Rewards Account Population Module 44 and Create Partner Rewards Account Population Module 46 may enable accumulating rewards earnings from activity in accounts in different lines of business to a single customer rewards account. The Modules 44, 46 receive Partner 80 and third party 78 account data from the External Population Data Processor 58. The Modules may also receive population data from the Internal Customer Population Processor 82, which stores Bank customer data, or directly from the Bank Interface 76.

The Modules 44, 46 may identify and assign customer membership numbers in any or all Partner rewards or loyalty programs, which it can pass back to the Partners 80 via the External Population Data Processor 58. For instance, the Modules 44, 46 may receive Partner loyalty files and assign numbers to those files. The Modules 44, 46 may capture and track those numbers, and the numbers can be displayed through various channels, such as various bank branches. The Modules 44, 46 may capture and/or track any and all Partner loyalty numbers, whether from Partners or non-Partners.

The Modules 44, 46 may assess and validate which customers are eligible for enrollment or access to a product, service, or feature based on predetermined rules. The Modules 44, 46 may also synchronize appropriate customer or member identifiers among the Bank, Partners 80, and third parties 78. For example, the Modules 44, 46 can provide real-time synchronization of a Partner airline frequent flyer number with a newly-acquired cardmember who holds a Partner frequent flyer account. This could enable embossing of the customer's account number onto the new plastic credit card (or other physical embodiment associated with an account) immediately following the cardmember's decision to enroll.

The Modules 44, 46 may additionally be configured to verify a customer's enrollment in real time.

The Modules 44, 46 may recognize and process changes in award level status in various Partner programs. For instance, a Partner may go bankrupt. The Bank Interface 76 may inform the Modules 44, 46 that the Partner went bankrupt by providing rules determining, for example, how to modify each Partner reward account. For instance, the Bank Interface 76 may specify how to convert earnings of the Partner account into another reward with a different Partner.

The Interrogate Reward Account Behaviors Module 48 and Interrogate Reward Account Transactions Module 50 process data to match triggering events with customer reward accounts. The Modules may receive triggering event information from the Offer Database Processor 20, the Account Data Processor 22, or the Rewards Account Data Processor 24. The Modules 48, 50 may also receive account data and rewards account data from the Account Data Processor 22 and the Rewards Account Data Processor 24.

The Interrogate Reward Account Behaviors Module 48 receives behavior data from the External Behavior Data Processor 60. The External Behavior Data Processor 60 stores information relating to customer behaviors. For instance, the Processor 60 may receive and store information relating to customer transactions at a Partner airline or hotel, which may or may not be otherwise stored in the system. The Processor 60 may also receive customer behavior information such as spending a week at a Partner hotel.

The Interrogate Reward Account Transactions Module 50 receives customer transaction information from the Transaction Data Processor 26, which stores transaction information for customer transactions involving a customer account. The Transaction Data Processor 26 receives Bank transaction data from the Transaction Data Module 27. The Transaction Data Module 27 may comprise a database that receives and stores all transactions on Bank-related accounts. For instance, the Transaction Data Module 27 may receive and store all transactions for all Bank customer credit cards, debit cards, and other accounts. The customer may also process transactions directly through the Transaction Data Module 27, e.g., via secure online payments wherein the transaction information feeds directly into the Transaction Data Module 27.

The Interrogate Reward Account Transactions Module 50 receives external transaction data from the External Transaction Data Processor 62, which stores customer transaction information that may not involve a customer account. External transaction data may comprise transaction data from Partners.

The Interrogate Reward Account Behaviors Module 48 receives reward account data from the Rewards Account Data Processor 24 and customer behavior data from the External Behavior Data Processor 60.

For instance, the Interrogate Reward Account Transactions Module 50 may determine from the Rewards Account Data Processor 24 that a customer is enrolled in XYZ rewards program. The Module 50 may then pull the XYZ program data from the Offer Database Processor 20 and discover that the XYZ program enables customers to earn a small gift for every platinum credit card transaction that has an amount over $50 during the month of February. The Module may then query the Transaction Data Processors 26, 62 for all transactions that were over $50. The Module 50 may then discover that the customer made two purchases in amounts over $50 during the month of February. At this point, the Module 50 could send this earnings information to the Rewards Account Data Processor 24. Alternatively, the Module 50 could pass this information to the Offer Qualification Module 52, which may then determine if the activities should earn rewards.

When the reward is part of a Partner reward program, such as frequent flyer miles or points for a Partner airline, the Interrogate Reward Account Transactions Module 50 may pass the earnings information to the External Transaction Data Processor 62, which may pass the earnings information to the Partner rewards system. The rewards in the Partner rewards program could then subsequently be processed by the Partner rather than the PRE.

The Interrogate Reward Account Behaviors Module 48 operates similarly to the Interrogate Reward Account Transactions Module 50, except it monitors behaviors instead of Bank transactions.

Whether the Modules 48, 50 determine earnings or not, the earning information produced by the Modules 48, 50 is preferably passed to the Offer Qualification Module 52.

The Offer Qualification Module 52 processes this earnings data and determines any reward earnings. For instance, it may determine that a customer did in fact make two purchases over $50 during the month of February, and therefore determine that the customer has earned two rewards. The Module 52 then checks with the External Suppression Data Processor 28 to determine whether the customer account is eligible to earn rewards. A customer may be ineligible if the customer's account has been suspended, closed, or delinquent, if too many transactions have been disputed, if credit card purchases have been returned and credited back to the account, the account is in bad standing with the Bank, or if the account has any other feature that the Bank considers adverse. If the customer account is eligible to earn rewards, then the Module 52 would then instruct the Rewards Account Data Processor 24 to amend the customer's rewards account to reflect the earned rewards.

When a reward is earned, the Module 52 may also pass the earning information to the Communication Module 64, which can communicate such information to the customer 74. The Module 52 may also pass the earning information to the Offer Fulfillment Module 54.

Some rewards programs may have earnings caps. The Bank Interface 76 may override such earnings caps and making earnings adjustments to a customer's rewards account.

In one embodiment, a customer may be enrolled in a points program wherein the customer may earn 1000 points for spending one weekend at a Partner hotel in the month of July. The Rewards Account Data Processor 24 and the Offer Database Processor 20 may pass this information to the Module 48. The customer may then spend a July weekend at the Partner hotel. The External Behavior Data Processor 60 may pass this behavior information to the Module 48. The Module 48 may acquire and process this data, and finally pass it to the Offer Qualification Module 52. The Offer Qualification Module 52 may generate instructions to add 1000 points to the customer's rewards account. The Module 52 would then pass the instructions to the Rewards Account Data Processor 24, which would add the points to the appropriate customer account.

Similarly, the Interrogate Reward Account Transactions Module 50 processes rewards. The Module 50 receives rewards account data from the Rewards Account Data Processor 24. The Module 50 receives external transaction data from the External Transaction Data Processor 62 and Bank transaction data from the Transaction Data Processor 26. Bank transaction data may comprise any transactions that involved a Bank account (i.e., for which the Bank has a record). Transactions such as credit card purchases or opening a savings account can also be considered behaviors, and they may be monitored by the Interrogate Reward Account Behaviors Module 48. External transaction data may comprise any transaction that does not involve a Bank account, e.g., transactions involving Partner accounts.

The Interrogate Reward Account Behaviors and Transactions Modules 48, 50 thereby interrogate customer behaviors and transactions to help determine customer reward earnings, which may later be posted to the Rewards Account Data Processor 24. The customer may be enrolled in multiple rewards programs on the same or different accounts. Each qualifying behavior or transaction will cause the Modules 48, 50 to post earnings to the customer's account(s). In this way, customers may participate in and accumulate earnings in multiple rewards programs simultaneously. Participating cardmembers may earn stacked rewards for earning points in multiple programs. Stacked rewards are when multiple earning behaviors and/or transactions must occur to earn a reward; e.g., by purchasing three round-trip airfares in one month, a customer might earn double miles for each purchase and then a bonus 1000 miles for making three purchases in one month. A reward program may offer a tie-in with other programs so that certain behaviors or combinations of behaviors can earn bonus points or rewards. For instance, while purchasing a flight might earn 10,000 miles in one program and renting a car may earn a 2% cash rebate in another program, doing both on the same weekend may earn an additional gift coupon through what is effectively a third tie-in rewards program. Such multi-tiered rules would be specified in the Rewards Account Data Processor 24, and the Modules 48, 50 would process the behaviors and transactions according to those stacked rewards programs. For instance, after a Module 48, 50 determines that a behavior earned a reward directly, it may inquire whether any combination of existing reward behaviors or transactions would enable another reward.

Through instructions from the Bank Interface 76 or another module, the Modules 48, 50 may add additional earnings opportunities and criteria to existing programs.

The Interrogate Reward Account Behaviors and Transactions Modules 48, 50 may allow the customer to purchase additional points in a bank's reward program, preferably as specified by configurable rules. For instance, the Modules

48, 50 may have a customized rule allowing cardmembers to purchase 10,000 Marriott points for $200.

A customer may earn a reward or reward currency for the occurrence of specific triggering events, transactions, and behaviors related to a specific bank product. For instance, customers may earn rewards for payments, purchases, opening an account, first use of a product or account, cash advances, or another reward trigger in a demand deposit account, credit card, or other bank product. However, the Modules 48, 50 may also exclude a specific type of event, transaction, or behavior from earning currency, in accordance with the rules of the offer as stored in the Offer Database Processor 20.

The Interrogate Reward Account Behaviors and Transactions Modules 48, 50 may allow customers to qualify to earn currency for transactions, events, behaviors with specific sets of attributes like location, time period, platform, frequency, merchandise category, merchant, threshold or other trigger attribute. For example, customers may earn at different rates depending on whether the purchase is from a particular Partner or non-Partner, or other factors such as time of day or store location. Customers can be rewarded with escalating bonus points or rebates for repeat purchases at specific merchants. Customers may receive an additional 1% rebate on purchases over $500; or they may receive 1% on all purchases if monthly purchases do not exceed $1000, and 1.5% on all purchases if purchases exceed $1000. Transactions with specific attributes may also be excluded from earning currency.

Preferably, the Interrogate Reward Account Behaviors and Transactions Modules 48, 50, alone or in conjunction with the Offer Qualification Module 52, may verify that specific customer transactions and behaviors occurred at a specific time and location according to an offer. For instance, if an offer grants rewards for transactions that occur each day after 4 pm at a restaurant, the Modules 48, 50, & 52 should be able to verify if a particular transaction fits this criteria and therefore should earn a reward or reward currency.

The Interrogate Reward Account Behaviors and Transactions Modules 48, 50 may offer "earnings sales" wherein customers earn currency at a specified rate for trigger events (e.g., transactions and specific behaviors) during a specific length of time. For instance, in the case of a rewards program where customers earn points at a particular rate, such as 10 points per dollar purchased, customers may earn double points on all purchases in the month of November.

The Interrogate Reward Account Behaviors and Transactions Modules 48, 50 may specify rules for expiration of earned currency balances for each of the specified earning categories of the program (i.e., categories based on events, transactions, and behaviors). For instance, the Modules 48, 50 may allow the customer to cash out earned currency, transfer or convert the currency to another rewards program, or it may hold the currency active for a period of time specified in the rules. The Modules 48, 50 may also specify rules for the disposition of currency balance when the status of the customer's account changes. For example, certain behavior or account status may cause or enable the Modules 48, 50 to suspend earnings accumulation.

Earnings may be capped for specific products, events, transactions, and behaviors, and/or for attributes of the events, transactions, and behaviors. The Modules 48, 50 may specify multiple caps for different criteria, and it may remove a cap if specific behaviors are met. For example, an exemplary rewards program may only allow a customer to earn a maximum of 10,000 miles in a month and 50,000 in a year for a type of credit card account. Another exemplary program may allow customers to earn double or triple points in February up to $1,000. Yet another program might allow customers to earn only 5,000 points per year for demand deposit account activity.

The Interrogate Reward Account Behaviors and Transactions Modules 48, 50 may automatically adjust earnings features based on changes in the status of a Partner program. For example, different earnings rates or maximums may be determined based on the status of a Partner's business. For instance, earning rates and maximums may change for a Partner's frequent flyer program during certain blackout periods or periods of peak activity, or during when special conditions are met that are related to the Partner's business.

The Interrogate Reward Account Behaviors and Transactions Modules 48, 50 may give a customer a reward or rewards currency in return for referring a new customer to a specific product or type of account.

The Interrogate Reward Account Behaviors and Transactions Modules 48, 50 may allow users to earn different forms of reward currency. The Modules 48, 50 may specify the form of currency (or other reward) earned by a customer or group of customers. For example, it may specify dollars, points, miles, Partner currency (such as Disney™ Dollars), specific physical items, or other rewards. The Modules 48, 50 may also allow customers to earn currency using different calculation methods and calculation rates. For example, the calculation methods of different programs may comprise: lump sum, ratios, ratio with tiers, ratio at threshold, or specific items. The programs may specify different calculation rates, such as 1 point for $1, or 1 point for $2.

Except for the function of interrogating reward behaviors and transactions, the additional earning functions described above for the Interrogate Reward Account Behaviors and Transactions Modules 48, 50 may also be accomplished by the Offer Qualification Module 52.

The Interrogate Reward Account Behaviors and Transactions Modules 48, 50 allows for the processing of various functions and capabilities related to the accumulation of rewards in a customer account. The Modules 48, 50 may track earnings accumulation by amount earned in categories, or it may track accumulation by a specific earnings rule. For example, the Modules 48, 50 may track earnings from Partner purchases (as a category) as separate from bonus points and other rewards.

Customers may accumulate reward currency earned in multiple Bank products and/or external products into one or more reward currency banks or accounts. For example, customers may earn a special type of rewards or points ("extraordinary rewards") for credit card purchases and for opening a demand deposit account, and the earned points may be combined in one extraordinary rewards points bank or maintained in two separate points banks.

The Interrogate Reward Account Behaviors and Transactions Modules 48, 50 may convert among forms of rewards currency to facilitate changing redemption options. To simplify conversion, all rewards (or all rewards from a particular institution) may have a universal currency translation method, or accumulation may occur in an underlying universal currency. For instance, each reward may correspond to a specific amount of universal rewards points, and rewards may be accumulated in units of universal rewards points. This way, a customer may cash out a different specific reward according to its "price" in universal rewards points.

The Interrogate Reward Account Behaviors and Transactions Modules 48, 50 may allow a customer to accumulate earnings at a household level. For instance, if the household includes several Bank customers, earnings may be accumulated and tracked in a single rewards account.

The Interrogate Reward Account Behaviors and Transactions Modules 48, 50 may link multiple accounts of the same (or different) product type to one rewards account. A fee may be waived or charged for this feature. For example, points may be funneled for multiple credit cards into one rewards account.

Rewards currency may be accumulated as soon as transactions and events are recognized, or they may be accumulated on a monthly account cycle processing. For example, earnings currency may be accumulated at midnight after each day's purchases and behaviors are recorded.

If a suspended account is later reinstated, the Interrogate Reward Account Behaviors and Transactions Modules 48, 50, and Offer Qualification Module 52 may retro-actively accumulate earnings that were missed due to the suspended status. Such rules or policies may provide additional incentive to customers to improve the status of their account and/or maintain their account in good standing.

The Interrogate Reward Account Behaviors and Transactions Modules 48, 50 and Offer Qualification Module 52 may return or reverse the redemption of rewards currency for a stored value. For instance, the Modules 48, 50 may add, subtract, or otherwise change the points, miles, or other value from a stored value card.

The Interrogate Reward Account Behaviors and Transactions Modules 48, 50 may suspend access to accumulated earnings. For example, this may occur if the reward earnings are the result of a fraudulent transaction.

Points may expire based on rules, which may relate to the date earned, account type, and other account information.

The Interrogate Reward Account Behaviors and Transactions Modules 48, 50 may transfer rewards currency to another customer rewards account. The Bank may charge a fee for the transfer.

The Interrogate Reward Account Behaviors and Transactions Modules 48, 50 may redeem currency from programs run by non-Partners for rewards in Bank affiliated programs. The Modules 48, 50 may also aggregate points from multiple programs. The Modules 48, 50 may cause the purchase of rewards currency from non-Partners. Such a purchase of rewards currency from third party rewards programs would require a relationship between the Bank and those third parties to establish a fair method (and currency price) for buying and exchange rewards and points.

The Offer Fulfillment Module 54 allows for the processing of various redemption capabilities and functions. The Module 54 receives fulfillment data from the Offer Qualification Module 52. The Module also receives external fulfillment data, such as Partner reward information, from the External Fulfillment Data Processor 66. The Module 54 determines where to send the fulfillment of a customer reward and then sends it to the appropriate party. Monetary rewards are passed to the Monetary Gateway 32.

The Monetary Gateway 32 provides the customer with monetary credits or cash. For instance, the Monetary Gateway 32 may send the customer a check via mail. It may also be able to charge them for shipping fees and other costs. Non-monetary, non-physical rewards such as points, miles, and stored value are passed to the Non-Monetary Gateway 34, which delivers such rewards to the customer, e.g., via a customer account. For some rewards, such as Partner points or miles, the Non-Monetary Gateway 34 may pass the fulfillment information to the External Transaction Data Processor 62 for external fulfillment. In the case of Partner miles, the Partner may pass the miles rewards directly to the customer's frequent flyer account with the Partner. Savings bonds, premiums, and other financial rewards may be passed to the Federal Reserve 36 for fulfillment. The Federal Reserve may then send the customer a reward such as a savings bond, Treasury bill, or other similar reward.

A fee may be charged to a customer for different offerings and/or different combinations of features in rewards programs. For instance, the Account Data Processor 22 may charge a fee to a customer's 74 account when the customer enrolls in a particular rewards account. For instance, a yearly fee of $10 may be charged for the ability to exchange a customer's earned rewards points for frequent flyer miles with a Bank Partner. Such fees would be specified in the rules defining the offer and or the terms of the account, which may be specified by the Bank Interface 76 and stored in the Offer Database Processor 20. Different fees may be charged to different groups of customers for a given feature. For instance, platinum cardholders may have a reduced fee compared to regular cardholders.

The Monetary Gateway 32 may charge a fee for the use of different redemption methods (e.g., automatic vs. on-demand). For instance, if a customer chooses to use an automatic redemption, then the Monetary Gateway 32 may charge the customer's account through a regular transaction at the Transaction Data Processor 26. The customer's account would then be debited by the appropriate amount as in a regular purchase transaction. For instance, the Bank Interface may have a rule associated with a particular customer's rewards program wherein the on-demand redemption feature will cost $10 in shipping and handling every time the customer redeems a reward. When the customer 74 elects to redeem a reward through the Communication Module 64 (or through another appropriate communication means, such as Rewards Account Data Processor 26 and Account Data Processor 22), the Communication (or other) Module 64 passes such request to the Offer Qualification Module 52 or the Offer Fulfillment Module 54. From there, the reward fulfillment request is passed to the appropriate fulfillment module 32, 34, 36, 38, 78, 80, and the Monetary Gateway debits the customer's account. Here, the transaction on the customer's account may contribute toward reward earnings.

The Monetary Gateway 32 may enable the integration of credit cards and stored value cards (e.g., a combined credit and stored value card). For instance, when an award is posted to a customer account, the Rewards Account Data Processor 24 may move the reward into a customer stored value account. Alternately, for stored value accounts with Partners and third parties, the value may be added to the stored value account through the regular processing of rewards through the Offer Fulfillment Module 54 and the stored value account provider (i.e., Third Party 78 or Partner 80). The customer may use the stored value according to the restrictions of the account. For instance, $10 of stored value on a Bank account may enable the customer to purchase $10 of goods or services from merchants who accept the Bank credit, whereas a $10 stored value account at a Partner coffee retailer may only be valid towards the purchase of coffee.

Physical rewards such as merchandise and gift certificates are passed to the Merchandise Gateway 38. For instance, the Merchandise Gateway 38 may send the customer a fluffy bear or a DVD player. Rewards that will be fulfilled by third parties 78 or Partners 80 are passed to third parties 78 or Partners 80, respectively. Finally, rewards may be passed to the External Fulfillment Data Processor 66 for external fulfillment, such as when the Bank has contracted with external parties to handle reward fulfillment.

Once the reward is passed to the appropriate party for fulfillment, the Offer Fulfillment Module 54 may notify the Communication Module 64 of the status of the reward. The Order Fulfillment Module may also debit the reward from the customer's account stored at the Rewards Account Data Processor 24.

When the reward is ultimately fulfilled by any of the above elements 32, 34, 36, 38, 78, 80, those elements may communicate back to the Offer Fulfillment Module 54 and/or the Fulfillment Data Processor 68 that the reward was fulfilled (i.e., that the reward was constructively delivered to the customer). Upon receiving confirmation that a reward was fulfilled (or not fulfilled) from elements 32, 34, 38, 78, & 80, the Fulfillment Reconciliation Module 56 may notify the Offer Fulfillment Module 54 and the Fulfillment Data Processor 68.

The PRE also enables the effective management of physical reward inventory through the Merchandise Gateway 38. The Merchandise Gateway 38 may communicate with the Fulfillment Data Processor 68 (or the Fulfillment Reconciliation Module 56) to exchange information related to the inventory of certain rewards. The Fulfillment Data Processor 68 keeps track of reward inventory. For instance, if the supply is very low, then the Fulfillment Data Processor 68 may notify the appropriate party at the Bank (such as the Bank Interface 76) of the delinquent supply so that remedial measures can be taken, such as discontinuing the reward or acquiring more. The Fulfillment Data Processor 68 can then notify the Offer Fulfillment Module 54 of the delinquent supply. The Report Module 70 may also query the Fulfillment Data Processor 68 regarding inventory and report such records to the Bank. If there is insufficient rewards available to fulfill a reward request, then the Offer Fulfillment Module 54 can amend the Rewards Account Data Processor 24 to reflect that the reward has not been processed. Alternate steps can be taken; e.g., the customer 74 can be notified via 64, 22, 24, or 26, and the customer can choose to switch to another reward.

Other information can be communicated between the Fulfillment Data Processor 68 and the Report Module 70. The Report Module can output a Fulfillment Reconciliation Report 72 that contains fulfillment information such as information relating to inventory or summary information about rewards processed and fulfilled during a specific time. The Report 72 may be sent to any appropriate party at the Bank or to a Partner 80 or third party 78.

Redemption can be automatic or on-demand. Automatic redemption occurs when a reward is provided to the cardmember automatically. For instance, if a reward program offered a 1% account credit for all purchases at a specific retailer for one week, then 1% of the amount spent at that retailer during that might be automatically credited to the cardmember's account. This may occur when the Offer Qualification Module 52 passes the earnings information to the Rewards Account Data Processor 24. The Processor 24 may automatically credit the account (which is stored in the Account Data Processor 22) as each qualifying purchase is made, or it may provide the credit at another time, such as at the end of the month, according to the provisions of the reward program. Alternately, a third party, such as the merchant, may automatically provide the reward. For instance, the merchant may send a check in the mail to cardmembers in the amount of 1% of the qualifying purchases.

On-demand redemption occurs when cardmember action is required for the cardmember to redeem the reward. For instance, a gift reward may be provided to cardmembers who purchase a particular product with a qualifying credit card, but the provisions of the reward program may require that the cardmember mail the receipt and UPC code for the product to a specific address in order to claim the reward. The gift reward may then be mailed to the cardmember after the receipt and UPC code are received at the address.

However, the financial transaction information received at the Interrogate Reward Account Transactions Module 50 and processed at the Offer Qualification Module 52 may include enough information for the Offer Qualification Module 52 (or appropriate Fulfillment Module, e.g., Merchandise Gateway 38) to determine that a gift reward should be mailed. Alternately, the customer may qualify immediately, and therefore the reward determination may bypass the Offer Qualification Module 52. For instance, a Partner 80 may determine that a particular customer or population automatically qualifies for a particular reward. They may pass the reward and population information from the External Processor 60, 62 to the Interrogating Module 48, 50. Because such rewards are in effect "pre-qualified" by the Partner, the reward instructions may pass through straight through the Offer Qualification Module 52 to the Offer Fulfillment Module 54 for fulfillment of the approved award.

It should be appreciated that different rewards programs will have different methods of redemption and fulfillment. Some rewards can be fulfilled by the Bank, others by third parties and/or Partners of the Bank. Some reward programs may provide for on-demand fulfillment, and some may provide for automatic fulfillment.

The Offer Fulfillment Module 54 may "burn points," i.e., hold auctions to reduce accumulated points that the rewards-giver previously purchased, was obligated to purchase, or otherwise obtained, or to otherwise reduce the amount of accumulated rewards held or owned by a reward-giver. For instance, the occurrence of a specified trigger behavior or event may trigger automatic currency redemption. For example, a coupon or check may be redeemed when a specified number of points accumulate, or upon an anniversary date, regular cycle processing, specific calendar date, or at another specified time. The redemption method may be also changed from automatic to on-demand.

The Offer Fulfillment Module 54 may employ an underlying universal currency or (currency translation capability) to facilitate redemption across any reward program by any customer.

The Offer Fulfillment Module 54 may define sets of one or more items for which currency can be redeemed (or exchanged for value). The Offer Fulfillment Module 54 may also add and delete items from any of these redemption sets. Redemption sets may comprise merchandise collections, sets of cash equivalents (checks and gift certificates), Partner airline miles, pre-defined travel packages, Partner merchant coupons, or other types of rewards. The Offer Fulfillment Module 54 may further give any customer or group of customers access to redeem currency for items in one or more redemption sets. The Offer Fulfillment Module 54 may change customer access to different redemption sets over time to support new offers. For example, the Offer Fulfillment Module 54 may allow a customer to redeem currency (or another reward) for Partner airline miles, items in a merchandise collection, checks and gift certificates, Partner coupons, or other rewards. The Offer Fulfillment Module 54 may offer Partner points/miles as a redemption option in other reward programs. The Offer Fulfillment Module 54 may also enable any customer to redeem currency for any good or service, as specified and limited by the rules defined by the Bank. These rules may be created by the Offer Database GUI (76) and stored in the Create Bank Offer Module or Offer Database Module.

The Offer Fulfillment Module 54 may limit access for a customer or a group of customers to a single redemption set or collection through definable rules. For example, the Offer Fulfillment Module 54 may offer customers a preferred Partner airline credit card that earns only Partner airlines miles (as in the prior art), with no access to or awareness of any other redemption options.

The Offer Fulfillment Module 54 may specify the redemption method (automatic or on-demand) for a customer or a group of customers, to change the redemption method through subsequent offers, and to allow or limit this capability with business rules. For example, the Offer Fulfillment Module 54 may set up customer to automatically redeem earnings for a competitor airline's miles or change the rewards program to allow customer to decide whether to redeem for the competitor airline's miles or redeem for items in a merchandise collection (with currency translation or exchange rate). The Offer Fulfillment Module 54 may automatically redeem for a Partner bookstore coupon or let the customer choose to redeem accumulated currency for a Partner bookstore coupon or for miles that will be transferred to a Partner airline account.

The Offer Fulfillment Module 54 may offer a customer access to a specific redemption set for a specific period of time. For example, the Offer Fulfillment Module 54 may give customers (who normally only have access to travel redemption options) access to merchandise options to support an offer to burn points (point burner offer). A point burner offer may comprise an offer, for a limited time, to redeem earnings for a golf club for 20,000 points instead of the usual 30,000 points.

The Offer Fulfillment Module 54 may maintain multiple collections of redemption items in flexible catalogs and make such redemptions available across multiple channels.

The Offer Fulfillment Module 54 may access rewards currency information at a merchant point-of-sale device in order to pay for the purchase. For example, a cardholder may access and use rewards at a suitable credit card terminal to pay for a merchant's product. For example, the Offer Fulfillment Module 54 may have real-time access to rewards currency balance through a payment network.

The Offer Fulfillment Module 54 may transfer value from the rewards account to a Stored-Value account in real-time, on-demand. For example, the Offer Fulfillment Module 54 may allow a customer to redeem rewards currency and have it immediately transferred to a stored value account. In this way, the customer can use the stored value at a merchant in a very short time.

The Offer Fulfillment Module 54 may function as a "Rewards Concierge" that obtains un-offered rewards on demand (or automatically) for a customer in exchange for rewards currency. A rewards concierge allows a customer to identify a product not currently listed as a redemption item and then calculate the item's cost in terms of rewards currency. The Rewards Module may then source and fulfill the item for the customer.

The Offer Fulfillment Module 54 may allow specific customers to supplement their accumulated currency with cash when redeeming for specified items. One example used by Philips Electronics is a "cash plus" system, wherein customers may purchase products from a retailer using a reward, such as points, but if the reward is insufficient to cover the purchase, the customer may pay the remaining balance in cash at the point of sale.

The Offer Fulfillment Module 54 may comprise all current redemption capabilities. Redemption capabilities may comprise merchandise, Partner currency, checks payable to the cardholder on a statement or letter to the cardholder, a coupon on a statement letter to the cardholder, or another valuable good.

The Offer Fulfillment Module 54 may apply reward currency to pay a monthly minimum account payment.

The Offer Fulfillment Module 54 may use accumulated currency to purchase or obtain a discount on specific types of future purchases. For example, the Offer Fulfillment Module 54 may allow a customer to accumulate gas-dollar-points at a gas station merchant such as BP. The Offer Fulfillment Module 54 may provide direct cash back to a customer's Bank asset account. The Offer Fulfillment Module 54 may donate currency to charity, either in the form of rewards currency or as a cash donation. The Offer Fulfillment Module 54 may redeem for an investment or long term savings product, or any other financial product. The Offer Fulfillment Module 54 may apply reward currency as a credit to a customer's account statement.

The Offer Fulfillment Module 54 may redeem currency to pay a variety of different fees and costs and to grant this capability by item, program, customer, or customer group. The Offer Fulfillment Module 54 may automatically waive a fee for accounts that show specific behaviors such as spending, revolving, or a specific tenure of being a cardholder. For example, the Offer Fulfillment Module 54 may remove or pay a customer's account fee or annual rewards fee, or it may pay for (or credit the cost of) rush shipping.

The Offer Fulfillment Module 54 may convert rewards points at some specified rate and send the points to a non-Partner airline or other Partner program.

The Offer Fulfillment Module 54 may redeem currency to reduce the annual percentage rate of an account, such as a credit card account, for a certain period of time. There may be limits on the reduction in rate and the time period.

The Offer Fulfillment Module 54 may be used to move rewards points to or from a stored value account. The Module 54 may request fulfillment from the Non-Monetary Gateway 34, which is configured to process the fulfillment of non-monetary rewards such as points, miles, or stored value. The Non-Monetary Gateway 34 may then pass the fulfillment information to an External Transaction Data Processor 62, which may create or credit a customer stored value account with a Partner or third party. The Monetary Gateway 32 may also be used to fulfill stored value rewards for accounts stored in the Account Data Processor 22 when the Module 54 sends it an appropriate request.

The Offer Fulfillment Module 54 may redeem the rewards for a US Savings Bond or other financial instrument.

The Offer Fulfillment Module 54 provides for the processing of various capabilities and functions related to the fulfillment of customer rewards. The method of fulfillment varies by reward program and redemption type. Fulfillment can be through the bank, a Partner of the bank, or a vendor. If the rewards earnings are sent to a Partner or vendor, then the bank (or cardmember) may need to contact the Partner or vendor to request the Partner or vendor to deliver the award to the cardmember. In a simpler example, the reward may be automatically delivered to the cardmember, such as when a coupon or check reward is enclosed with, printed on, or attached to the cardmember's monthly statement.

The rewards earnings/points can be sent to third parties for redemption and fulfillment. For instance, a cardmember may earn frequent flyer miles with a Partner airline by engaging in specific behaviors, such as renting cars from a Partner car rental company. At a specified time, such as monthly or after a cardmember earns a threshold number of points, the points could be sent to the Partner airline. If the cardmember has an account with the Partner airline, those points could be stored in that account. The cardmember's frequent flyer miles could then be redeemed through the Partner airline directly or through the Partner airline's affiliates, such as when the cardmember applies the miles earnings toward free or discounted air travel or car rentals, respectively.

The Offer Fulfillment Module 54 may generate electronic coupons.

The Offer Fulfillment Module 54 may specify the fulfillment channel or vendor for each redemption item, and it may supply the information required for fulfillment. The Offer Fulfillment Module 54 may quickly change the specified fulfillment channel or vendor for any item and reroute fulfillment requests for changed items to the appropriate channel or vendor.

The Offer Fulfillment Module 54 may track and generate a Partner numbering scheme on reward coupons, and it may calculate and generate expiration dates on coupons and certificates via statement or letter.

The Offer Fulfillment Module 54 may allow the customer to elect to obtain an earned reward (such as a check) via email, on a statement, or transfer to a demand deposit account.

The Offer Fulfillment Module 54 may also wire transfer funds to Financial Partners. This may occur when the PRE runs another bank or other company's rewards program when the other bank or other company would prefer their customer's reward to be received from the other bank or company rather than the Bank operating the PRE.

The Report Module 70 may provide for various capabilities and functions relating to analysis and targeting.

The Report Module 70 may output various reports based on data received from other elements of the PRE. For instance, the Report Module 70 may generate a New Offer Created Report when a new offer is created. This report may also be generated by the Create Bank Offer Module 40 and the Create Partner Offer Module 42, which may then pass the report to the Bank Interface 76. The Report Module 70 may generate a New Locked Offer Report when a new offer is locked. A new offer is locked when the population is closed, and no further customers will become eligible to enroll in the program (unless another rule enables them to enroll). The Report Module 70 may generate a Population Reject Detail Report when a population is rejected, which may occur when a customer account or population set is rejected for one or more offers. The Report Module 70 may generate a Population Missing Report when it is determined that a population was missing. Some or all of these reports may also be created by the Communication Module 64 and passed to the Bank Interface 76.

The Report Module 70 may target offers to the customers most likely to redeem a reward for higher-cost items. For example, if the previous behavior on a customer or similar customers indicate a likelihood to redeem an airline ticket award, the Report Module 70 may send the customer a point-burner offer to reduce the Bank's exposure to accumulating too many rewards obligations. The Report Module may send such information to the Fulfillment Reconciliation Report Module 72, which may send the information to the Bank Interface 76. It may alternately send the information straight to the Bank Interface 76. The information could then pass through the PRE to the customer 74.

The Report Module 70 may analyze customer spending or merchant patterns. Based on such analysis, the Report Module 70 may recommend that a customer receive an automatic offer or eligibility for new features with immediate visibility across multiple channels, for instance, any of the communication channels discussed above. The Report Module may send such information to the Fulfillment Reconciliation Report Module 72, which may send the information to the Bank Interface 76. It may alternately send the information straight to the Bank Interface 76. The information could then pass through the PRE to the customer 74.

The Report Module 70 (and/or the Bank Interface 76, using data from the Report Module 70) may provide modeling analysis. For instance, the Report Module 70 may recommend that some rewards should be offered only to rewards seekers with the potential to be profitable.

The Report Module 70 may supply detailed activity information for a Bank's marketing target analysis. The Report Module 70 may provide information about rewards activity, accumulation bank status, and other rewards-related information to Customer Relationship Management (CRM) and Campaign Management (i.e., managing marketing campaigns to). Campaign Management may comprise managing product or marketing campaigns to attract more customers or otherwise improve business and profits for one or more products or programs. For instance, a marketing department, by way of the Bank Interface 76, may collect internal data about the PRE. It may collect this data from the various Modules directly (as shown in FIG. 3A), or it may collect some or all of the information from the Report Module 70 (optionally via a Fulfillment Reconciliation Report 72). The Bank Interface 76 may then aggregate or otherwise process the information for marketing or other internal purposes. For instance, the Bank Interface 76 may aggregate usage data for accounts in various rewards programs to determine the effectiveness of one program compared with another. Based on the marketing data, the Bank Interface may output rules to the PRE to create more rewards program offers, such as offers that have features similar to the most successful rewards programs.

The Report Module 70 may send information to the Bank Interface 76 automatically when certain criteria are met. For example, the Report Module 70 may send a message whenever a specific customer is within a certain percentage of a redemption threshold. Such information may be used for a variety of purposes, such as to monitor and change reward inventory as necessary, or to determine the next set of rewards programs based on the availability of rewards for current programs.

Analysis of customer redemption patterns may result in automatic eligibility for new feature offers. These new offers may be immediately accessible to the customer 74 via any of a variety of channels as discussed above. Information about customer redemptions may be received by the Fulfillment Reconciliation Module 56 and passed to the Report Module 70 via the Fulfillment Data Processor 68. The Report Module 70 may then pass the data to the Bank Interface 76 (via the Fulfillment Reconciliation Report 72). The offers may be communicated to the customer via the Communication Module 64 or Account Data Processor 22. For example, a Web advisor or Card Member Services (CMS) advisor may change its web page or the rewards programs offered (or otherwise change communications) when a customer pattern is detected. The Web advisor and Card Member Services advisor may be accessible via the Communication Module 64 or other modules that interface with the customer 74.

The Report Module 70 may calculate costs of rewards currency earnings (e.g., points) at the account level based on a calculated or estimated cost per currency point. The Report Module 70 may first determine how the cost basis determined. The Report Module 70 may support the ability to manage accrual at an account level, a portfolio population or sub-population, or an entire rewards program.

The Report Module 70 may reconcile and settle reward currency disputes or settlements among vendors, Partners, processors and the Bank (or multiple banks) based on business rules. The Report Module 70 may provide up-to-date reconciliation at a frequency defined by Bank. Such account reconciliation may include both accumulation and balance information.

The Report Module 70 may track a customer's (or class of customer's) history of earnings by the qualifying trigger types and attributes and by specific product and account. The Report Module 70 may differentiate points earned on credit card transactions as compared with demand deposit account activity. The Report Module 70 may track earnings separately for Partner purchases, activity bonus (first use or open account), non-Partner purchases, and other criteria. Such information can be used to determine how the costs of specific rewards programs or other PRE features. The information tracked by the Report Module is passed to the Bank Interface 76 and processed as described above. The Bank Interface 76 processes the information to determine appropriate changes in the system in the interest of profitability or long-term Bank growth, or other business interests, and then creates new rules or changes old rules and propagates those rules through the system as described above.

Through the Report Module 70, the PRE may produce audits, controls, and file reconciliations in order to allow for monitoring the efficiency and accuracy of the PRE, as described below.

The Report Module 70 is configured to send specific auditing reports to the Bank Interface 76 (e.g., via the Fulfillment Reconciliation Report Module 72), based on information received from the various Modules (as shown in FIG. 3A). Information may be provided to the Report Module on a daily or other timely basis.

From the Create Bank Offer Module 40 and Create Partner Offer Module 42, the Report Module 70 receives information regarding: offers started, offer alerts, offers locked, and offers modified. Such information may detail such offer information by the frequency of each offer campaign identifier, the campaign name, the offer identifier, the offer subtype, and/or other criteria.

From the Interrogate Reward Account Behaviors Module 48, the Report Module 70 may receive cancellation and rejection reports for single and multiple accounts and offers, including those for existing populations. The reports may detail the frequency of a particular offer, the reasons for a particular rejection, the offer name, and the customer account numbers.

From the Interrogate Reward Account Transactions Module 50, the Report Module 70 may receive a tracking report detailing the frequency of an offer and the account number of the accounts that did or did not have data applied to them during a certain time period. The frequency and other data may be received by the Interrogate Reward Account Transactions Module 50 from any of the Account Data Processor 22, the Rewards Account Data Processor 24, and the Transaction Data Processor 26. The same data may be received by the Report Module 70 from those modules via the Communication Module 64, or another indirect route of information through the system, such as via the Interrogate Reward Account Transactions Module 50.

From the Offer Qualification Module 52, the Report Module 70 may receive a tracking report detailing the frequency of an offer and the account number of accounts that went through the qualification process and either qualified or did not qualify for the offer.

From the Fulfillment Reconciliation Module, the Report Module 70 may receive a status report detailing the frequency of a number of qualifying accounts by offer and internal or external status. The Module 70 may also receive information regarding the daily minimum, maximum, mean, and/or sum of the amount spent by the qualifying accounts. Report Module 70 may also receive information regarding the rewards fulfilled successfully. This information may describe the frequency of customers qualifying. This may be detailed by offer, by account number, by the recipient of the fulfillment file (e.g., 32, 34, 36, 38, 78, or 80). The Report Module 70 may also receive information regarding the reward fulfillments that were rejected, and this information may be detailed by reasons for rejection (such as the reason code). This information may describe the frequency by active or live offer; by date; by account number; by the recipient of the fulfillment file; by the reason code (e.g., from a reject report) which may comprise the number of purged or product traded accounts; by rewards offer; and by account number when the reason for rejection is that the reward was product traded, closed, lost or stolen.

The Report Module 70 may receive similar associated information from the other Modules. The Report Module 70 (e.g., via the Fulfillment Reconciliation Report Module 72) and the Communication Module 64 may output memo reports, phase reports, live offer cancellation reports, and offline earn reports, success, and failures. Such information may describe the frequency by offer identifier, by the memo posted to accounts, by phase, by subtype, by account number, by the number of accounts that arrived through a Partner file, the accounts that are live or active, notification sent, and cancelled offers by reason code.

Such auditing processes may allow for internal and external audits upon demand. For instance, an external source such as a Partner 80 or third party 78 may request an audit by via the Bank Interface 76. The Bank Interface 76 may then create and provide rules requesting the various Modules to output audit reports. Any of the Modules may be configured to perform such self-audits. Self audits may comprise checking to confirm that information was received by the Module and that the information comprises appropriate content and appropriate formatting. For example, the Create Rewards Account Population Module may output a report to confirm that a file was received, that the file has appropriate information content, and that the file has the appropriate header and/or trailer information.

The PRE is designed to operate in a test or simulation mode. In such a mode, there may be no actual customers or real transactions, but rather simulated customers, accounts, transactions, and rewards. The PRE could operate as it would for a real promotional rewards program, except that the necessary external inputs and communications with the PRE system would be fabricated by the Bank Interface 76 or another test entity. The Bank Interface 76 could monitor the performance of the various modules through direct monitoring, as shown on FIG. 3A, and/or via the Report Module 70. The Bank Interface 76 could analyze the offers, rewards, earnings, fulfillment, and other functions to ensure that the PRE is working and producing proper results. For instance, in the test mode, the Bank Interface 76 would ensure that simulation customers in a fake miles rewards program accumulate and earn miles, rather than another reward like cash rebates.

An advantage of the PRE is that it may de-couple reward participation from plastic fulfillment. In other words, the physical plastic card (e.g., a credit card) may no longer be necessary to obtain awards. As described above, the rewards may be accrued and fulfilled without regard to the physical plastic. For instance, the customer can request rewards online. In addition, a cardmember may switch redemption or default accumulation options without the need for a re-issue of a plastic card; again, such selections can be made online or via other communication channels that do not involve a physical card.

Referring to FIGS. 3A and 3B, the Rewards Account Data Processor 24, the Interrogate Reward Account Transactions Module 50, and the External Transaction Data Processor 62 may communicate with each other to reconcile rewards provided through Partners 80 and third parties 78 (via the External Transaction Data Processor). A reward accumulated at the Processor 24 may be passed through the Module 50 to the Module 62, where the reward is passed to a third party 78 or Partner 80 for fulfillment. The outside party 78, 80 would confirm to the Processor 24 through the Modules 50, 62 that the reward will be fulfilled, and the reward is deducted from the customer's rewards account stored in the Processor 24. The Processor 24 and Modules 50, 62 may thereby provide closed-looped reconciliation of file transfers to Partners 80 and third party vendors 78. Appropriate reporting may be passed to the Reporting Module 70.

The Report Module 70, Fulfillment Data Processor 68, and Offer Fulfillment Module 54 may communicate through each other to provide reasonableness checks, audits, and reporting for accumulation and redemption. For instance, when the Fulfillment Data Processor receives information about missing reward inventory or a list of rewards rejected, it may pass it to the Report Module 70.

The Bank Interface 76 may run rewards and loyalty programs for Partners 80 and non-Bank businesses. This may require the capability for multiple input/outputs with those Partners 80 and non-Bank businesses. For instance, it may require that Partners 80 and third parties 78 output all customer transaction information to the Bank, e.g., to the Bank Interface 76, External Behavior Data Processor 60, and the External Transaction Data Processor 62. It may also require the Partners 80 and third parties 78 to provide activity tracking and invoicing information to the PRE.

The PRE allows a Bank, or a department of a Bank such as a marketing department, to offer multiple additional rewards earning opportunities to credit cardmembers. The processing is controlled by a rules-based engine, in which the Bank or its various business lines can specify the cardmember eligibility and earnings rules. Cardmembers are targeted for specific promotional rewards offers and enrolled in one or more promotional rewards programs. Rewards are then earned based on explicit cardmember behaviors and transaction qualifications. Eligible cardmembers are awarded promotional rewards only when the specific behaviors and/or transactions qualify for rewards under the earnings rules.

Rewards earnings (or rewards) may be any of the following: a physical reward, such as a plush toy or monetary certificates; a monetary reward, such as a credit to a cardmember's account; a non-monetary reward, such as points or miles, which can be applied to a rewards account or to a stored-value card; a federal reserve savings bond; donations to a charity such as an educational institution; or another product or service that may be of value to a bank customer. Rewards earnings may even be "earned" by purchasing them outright.

Rewards earnings are accrued when specific transactions or behaviors occur during a reward program's earning period. The specific transactions or behaviors which trigger rewards ("triggering behaviors") may comprise: credit and debit card transactions, such as debit transactions, opening an account, paying a balance, paying interest, and linking with another account; other transactions associated with the Bank offering the reward, such as making a deposit, making a withdrawal, paying interest, drafting a check, paying a fee for a banking service; loan transactions, such as paying interest, transferring a balance, issuing a convenience check, and accessing a line of credit; a merchant purchase; checking and savings account activity; account payment transactions, such as setting up a recurring payment, enabling an auto-payment, paying an annual fee, or paying a rewards fee; transactions with Bank Partners; transactions with third parties; brokerage transactions, such as purchasing or selling securities, depositing funds, and transferring holdings from an external account to a Bank account; and other transactions or behaviors. Some other triggering behaviors may comprise purchases, transferring a balance, opening a checking account, opening a credit or debit account, applying for a loan or other credit account, paying a balance on time, and maintaining at least a specified minimum balance. Triggering behaviors may also comprise: accumulating a specific amount of charges; charging a specific amount; charging a certain number of transactions; transacting at a specific location; using an account card for identification purposes; or otherwise using an account card for purposes other than financial transactions. Yet other triggering behaviors/transactions may comprise: obtaining a cash advance and using a convenience check. It should be noted that some behaviors do not necessarily require any action on the part of the cardholder. For instance, in some circumstances maintaining a minimum account balance might be satisfied by merely refraining from withdrawing funds from the account.

Other behaviors and transactions that may impact rewards may comprise: having a specific account balance; having above or below a specific average daily balance; revolving an account balance versus paying in full; having an inactive account; maintaining a type of account balance. Behavior and transaction data is stored at the External Behavior Data Processor 60, the External Transaction Data Processor 62, the Transaction Data Processor 26, and the Account Data Processor (which stores behavior data related to accounts).

A rewards earning period, i.e., the time period during which a reward may be earned, may be any definable time period, such as: all weekends in March, 2004; Nov. 28, 2005; the entire year of 2005; May 16, 2004 through Jun. 5, 2004; the holidays in November, 2004; March, 2004, and June, 2004; Tuesday, Wednesday, and Thursday of the first quarter of 2003; the hours of 8:00 am to 5:00 pm E.S.T. from Jan. 7 to Feb. 10, 2004; and a period of one month beginning when a cardmember makes a first purchase on a credit card.

The Bank Interface 76 rules may enable any credit card transactions (e.g., purchases, balance transfers, convenience checks, adjustments, and customer service disputes) to qualify as rewards earning transactions for any rewards offer. These credit card transactions can be interrogated from the credit card processor or from a file provided by an outside entity.

The Bank Interface 76 rules may classify the credit card transactions by transaction type, e.g., purchase, balance transfer, convenience check, or adjustment. Any combination of transaction types can be chosen as qualifying agents for a reward offer, as defined in the Bank Interface 76 rules. For instance, the Bank Module may specify that all balance transfers and convenience checks may qualify for an offer. The Interrogate Reward Account Transactions Module 50 is configured to determine the transaction type of the transactions it processes from the Transaction Data Processor 26 and the External Transaction Data Processor 62.

The PRE may be configured to match credit card debits (e.g., purchases) and credits (e.g., refunds). For instance, any credit card debit transaction that is subsequently reversed by a matching credit card credit transaction (e.g. return, adjustment, etc.) may have its initial related rewards earnings reversed (i.e. nullified). Also, even if that reverse transaction happened after the credit card account had issued a statement to the customer or the initial reward has been redeemed; thus, it may be possible to have a negative rewards balance. For instance, when the Interrogate Reward Account Transactions Module 50 processes refund or other credit transaction data from the Transaction Data Processor 26, it may automatically reverse any reward earned by a prior corresponding debit transaction. Alternately, such transaction and reward-earning data may be checked by the Offer Qualification Module 52 prior to authorizing the fulfillment of a reward.

The PRE may be configured to identify a Bank's credit card accounts that are active and in good standing. This information may be posted by the Bank (e.g., through the Bank Interface 76) to the External Suppression Data Processor 28, where it can be interrogated by the Offer Qualification Module 52 prior to authorizing the fulfillment of a reward. For instance, the Offer Qualification Module 52 may only qualify credit card accounts that are active and in good standing (i.e. not delinquent) for a reward at any given time. If an account is not in good standing, then when prompted, the External Suppression Data Processor 28 will notify the Offer Qualification Module 52 of the status of the account, and the Offer Qualification Module 52 may not process the reward for fulfillment. Each offer may have different rules. The rules may also incorporate the cardmember's status for other bank products. For instance, by opening a checking account a customer may earn 5000 miles on the customer's credit card account.

The PRE comprises one or more processors that can calculate mathematical formulas, e.g., the Offer Qualification Module 52. Monetary and non-monetary rewards earnings may be determined by a mathematical formula containing a transaction amount, or the earnings could be a fixed rewards earning amount. Non-monetary rewards earnings may be mathematically determined in a variety of ways as prescribed by the rules provided by the Bank Interface 76. For instance, a reward program may offer rewards points equal to the accumulated transaction amount times 2.00 (i.e., double points). The Bank Interface 76 may provide a reward program wherein customers earn different rewards based on different spending thresholds, for instance, an offer specifying that if the transaction amount is less than $1001 then the rewards points equal the transaction amount times 2.00, otherwise the rewards points equal 3.00 times the transaction amount (i.e., earning threshold). Similarly, the Bank Interface 76 may provide three tiers of earnings rates, wherein transaction amounts greater than $1000 earn points equal to the sum of the portion of the transaction amount less than $1000 times 2.00, plus the portion of the transaction amount greater than $1000 times 3.00. The Bank Interface may also provide a reward program wherein reward miles equals the transaction amount plus 2000. The Offer Qualification Module 52 may also be configured to allow for phased offers and phased rewards, where a customer earns a consistent or increasing level of a reward for performing a desired behavior (or transaction) over a longer period of time. For instance, according to one phased offer, a customer may earn 1000 points for spending $500 in June, 2000 points for spending $500 in July, and 3000 points for spending $500 in August, where the July points can be earned only if the June threshold was satisfied, where each successive phase of earnings can only be accrued if the prior phase is completed successfully (i.e., additional points in August can be earned only if the customer spent $500 in both June and July). Through another phased offer, a customer may earn 500 bonus miles each month for the next five months as long as the customer spends $500 per month (or makes a certain number of purchases).

The PRE applies rewards earnings to the cardmember's rewards account. rewards earnings will be applied to the cardmember's rewards account after the specific rewards offer earning period has ended on the specific rewards offer award date, or the reward may be awarded at other specified reward offer earning distribution dates.

The PRE may identify credit card transactions at the account level. Only Credit card transactions made by a specific cardmember account at a Bank can be used to qualify that cardmember account for Reward earnings given to that cardmember account. I.e., a cardmember's credit card transactions-related rewards earnings cannot be applied to a different account held by the cardmember. The processor can determine rules.

The PRE may qualify a single credit card transaction. A single credit card transaction (or multiple transactions) can be qualified for a rewards offer based on a combination of factors according to the rules defining the reward offer, such as: whether the source of the transaction (e.g. Bank Identification Number (BIN), cardholder acceptor ID (CAID) and/or Standard Industry Code (SIC)) was in the specific rewards offer source requirement (e.g., the PRE may qualify a tax payment for a reward if the payment is made using a specific credit card). For instance, a reward program may provide a reward to a customer for paying the customer's property taxes using a Bank credit card. The credit card transaction for the tax payment would have identifier information indicating that it was a tax payment. Such transaction information would be collected by the Transaction Data Module 27 and passed to the Transaction Data Processor 26. The Offer Qualification Module 52 may then determine that the customer earned a reward when it processes the customer transaction information and determines that a customer reward program in which the customer is enrolled provides reward earnings for tax payments. Other factors include: whether the credit card account number is eligible to participate in the reward offer (e.g., whether the account number satisfied the specific rewards offer account portfolio requirement, e.g., entire portfolio, Partner, co-brand targeted accounts); whether the transaction was made within the specific rewards offer earning time period; whether the amount of the transaction (or accumulated amount for multiple transactions) was greater or equal to the specific rewards offer trigger amount (minimum $0.01, in increments of $0.01); and whether the debit transaction type was in the specific rewards offer set of debit transaction types. The PRE may also qualify a single credit card transaction based on the merchant or the transaction records pertaining to the description of the merchant.

The PRE may qualify a customer on multi-period rewards earnings periods. Multi period rewards earnings periods can be used in a rewards offer to determine cardmember eligibility for subsequent earnings periods. For instance, a cardmember might only qualify for the current rewards earning period if they have already qualified in the previous rewards earning period, e.g., in a phased offer. However, a rule may specify that cardmembers always qualify for the first rewards earning period or tier. This functionality may be accomplished through Modules 44 & 46 which create the populations for a particular offer (or offer subset, such as a second phase of an offer). Alternately, this functionality may be accomplished when Modules 48, 50, & 52 determine rewards earnings and valid reward-earning behaviors and transactions.

The PRE may identify accounts that have been purged or that have a card that has been lost or stolen. For instance, such information may be posted directly to the Bank via the Communication Module 64, the Bank Interface 76, or the Account Data Processor 22, e.g., if the customer reports a lost or stolen card. Such information may thus be directly or indirectly provided to the Account Data Processor 22 to reflect the new account data. If a credit card account is lost or stolen, then the Account Data Processor 22 may transfer any of its rewards offers and associated rewards balances to the replacement credit card account as soon as the new account is available. If a credit card account is purged, then any of its rewards offers and associated rewards balances may be removed based on rules governing retention of records and reinstatement of closed accounts. If the account is purged from the base rewards system, the account must be purged from the PRE (and the Account Data Processor 22), except possibly for purposes of record-keeping.

The PRE may "product switch" accounts. A product switched account may comprise an account with an associated rewards program that is converted or otherwise switched into another account or account portfolio that has a different associated rewards program. To accomplish this, the Bank Interface 76 may create rules that pass through the system in order to edit the appropriate rewards accounts (and/or customer accounts) that are being product switched. For example, the Bank Interface 76 may send rules to the Create Bank offer Module 40 or Create Partner Offer Module 42, which may then create the new offer or switch it with the old one. Alternately, the Bank Interface 76 may directly modify the Account Data Processor 22 and Rewards Account Data Processor 24 to convert the old account to the new one. Other Modules and/or Processors may be modified or provided rules as needed.

Product switching may occur when a Partner account portfolio (i.e., collection of accounts and rewards programs) is eliminated or switched into a portfolio of a different Partner. For example, a VISA portfolio (i.e., collection of accounts and rewards programs) may include a VISA-sponsored credit card account with frequent flyer rewards. The VISA portfolio may be eliminated when the Bank switches all of its accounts to MasterCard. In this event, the VISA-sponsored credit card may be converted into a MasterCard-sponsored account with a 1% rebate on all purchases. If a credit card account is product switched into another portfolio or account, then all of its rewards offers and associated rewards balances that existed in the portfolio or account before it is switched must be transferred or converted to the new credit card account or portfolio. In another example, if a Partner airline credit card account is product switched into a Partner hotel credit card account, then the account does not continue to earn airline-related rewards; rather, it will earn hotel-related rewards.

Rewards earnings balances for a specific rewards offer may be capped at a maximum value, according to the rules governing the program as defined by the Bank Interface 76.

Memorandums, notes, or other information may be posted to the cardmember account information stored in the Account Data Processor 22. All cardmember accounts that are eligible for a specific rewards offer, qualified for a specific rewards offer, or have been fulfilled for a specific rewards offer may have a related memo placed on their cardmember account. For instance, the Communication Module 64, Bank Interface 76, Create Rewards Account Population Module 44, or other elements in communication with the Account Data Processor 22 may post such information to the account. The Bank may service these memos, e.g., through the Bank Interface Module 76.

Each of the Modules and Processors can be modified, e.g., by the Bank Interface 76, during a reward program. For instance, the Offer Fulfillment Module 54 may be given instructions not to send fulfillments for a set of specific rewards, or for a set of rewards that satisfy specific criteria.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A method for identifying and offering reward programs, comprising:
    at least one computer processor identifying a first reward program that a customer is enrolled in, the first reward program having a first account and associated with a first reward offer;
    receiving, from the customer, authorization to product switch from the first reward program to a second reward program, the second reward program having a second account;
    the at least one computer processor establishing one or more conversion rules for transferring the customer's rewards in the first account to rewards in the second account, wherein the one or more currency conversion rules comprises one or more specified reward program transfer pairs indicating an allowable conversion of rewards from the first reward program to the second reward program;
    the at least one computer processor converting rewards in the first account rewards in the second account based on a conversion rate and in real-time, wherein the conversion rate comprises a universal unit to facilitate conversion of the rewards from the first account to the second account;
    the at least one computer processor depositing the converted rewards to the second account;
    the at least one computer processor automatically terminating the customer enrollment in the first reward program once the converted rewards are deposited the second account; and
    the at least one computer processor transferring the first reward offer to the second reward program.

2. The method of claim 1 wherein the rewards comprise redeemable points.

3. The method of claim 1 wherein the rewards comprise cash value.

4. The method of claim 1 wherein the rewards are issuer-specific or sponsor-specific.

5. The method of claim 1 wherein identifying a first reward program that the customer is enrolled in comprises receiving account information associated with the first reward program from the customer.

6. The method of claim 1 wherein the first reward program is associated with a financial account.

7. The method of claim 1 wherein the first account is associated with a financial institution.

8. The method of claim 1, wherein the second reward program comprises a plurality of reward programs.

9. A system for identifying and offering reward programs, comprising:
   at least one server, comprising at least one computer processor, communicatively coupled to a network;
   the at least one server configured to:
   identify a first reward program that a customer is enrolled in, the first reward program having a first account and associated with a first reward offer;
   receive authorization to product switch from the first reward program to a second reward program, the second reward program having a second account;
   establish one or more conversion rules for transferring the customer's rewards in the first account to the second account, wherein the one or more currency conversion rules comprises one or more specified reward program transfer pairs indicating an allowable conversion of rewards from the reward program to the second reward program;
   convert rewards in the first account to rewards in the second account based on a conversion rate and in real-time, wherein the conversion rate comprises a universal unit to facilitate conversion of the rewards associated with the first reward program to rewards from the first account to the second account;
   deposit the converted rewards to the second account;
   automatically terminate the customer enrollment in the first reward program once the converted rewards are deposited the second account; and
   transfer the first reward offer to the second reward program.

10. The system of claim 9 wherein the rewards comprise redeemable points.

11. The system of claim 9 wherein the rewards comprise cash value.

12. The system of claim 9 wherein the rewards are issuer-specific or sponsor-specific.

13. The system of claim 12 wherein the issuer-specific or sponsor-specific exchange entity comprises any redeemable value.

14. The system of claim 9 wherein the identification of the first reward program is provided by the customer.

15. The system of claim 9 wherein the first reward program is associated with a financial account.

16. The system of claim 9 wherein the first account is associated with a financial institution.

17. The system of claim 9, wherein the second reward program comprises a plurality of reward programs.

18. The method of claim 1, wherein the first reward program is associated with a first credit card association, and the second reward program is associated with a second credit card association.

19. The system of claim 9, wherein the first reward program is associated with a first credit card association, and the second reward program is associated with a second credit card association.

\* \* \* \* \*